United States Patent
Namiki et al.

(10) Patent No.: US 9,672,630 B2
(45) Date of Patent: Jun. 6, 2017

(54) CONTOUR LINE MEASUREMENT APPARATUS AND ROBOT SYSTEM

(71) Applicant: FANUC Corporation, Yamanashi (JP)

(72) Inventors: Yuuta Namiki, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/851,158

(22) Filed: Sep. 11, 2015

(65) Prior Publication Data
US 2016/0086343 A1 Mar. 24, 2016

(30) Foreign Application Priority Data
Sep. 18, 2014 (JP) .................. 2014-190182

(51) Int. Cl.
| | |
|---|---|
| H04N 13/02 | (2006.01) |
| G06T 7/00 | (2017.01) |
| B25J 9/16 | (2006.01) |
| G01B 11/24 | (2006.01) |
| G06K 9/46 | (2006.01) |
| G06K 9/52 | (2006.01) |
| G06T 7/60 | (2017.01) |
| H04N 5/225 | (2006.01) |

(Continued)

(52) U.S. Cl.
CPC .......... *G06T 7/0085* (2013.01); *B25J 9/1697* (2013.01); *G01B 11/24* (2013.01); *G06K 9/4604* (2013.01); *G06K 9/4661* (2013.01); *G06K 9/52* (2013.01); *G06T 7/001* (2013.01); *G06T 7/593* (2017.01); *G06T 7/60* (2013.01); *H04N 5/2251* (2013.01); *H04N 5/247* (2013.01); *G05B 2219/37359* (2013.01); *G05B 2219/40564* (2013.01); *G06T 2207/10012* (2013.01); *G06T 2207/10028* (2013.01); *G06T 2207/30164* (2013.01); *Y10S 901/09* (2013.01)

(58) Field of Classification Search
None
See application file for complete search history.

(56) References Cited

U.S. PATENT DOCUMENTS

| | | |
|---|---|---|
| 2012/0224033 A1 | 9/2012 | Hayashi |
| 2013/0342659 A1 | 12/2013 | Onishi |

(Continued)

FOREIGN PATENT DOCUMENTS

| | | |
|---|---|---|
| CN | 1483999 A | 3/2004 |
| CN | 103075973 A | 5/2013 |

(Continued)

*Primary Examiner* — Kate Luo
(74) *Attorney, Agent, or Firm* — Hauptman Ham, LLP

(57) ABSTRACT

A contour line measurement apparatus includes an edge line extraction unit for setting a picture processing region and extracting an edge line from an object picture in each of the regions, an edge point generation unit for generating edge points which are intersections of the edge lines and epipolar lines, a corresponding point selection unit for selecting, from the plurality of edge points, a pair of edge points corresponding to the same portion of the reference contour line, and a three dimensional point calculation unit for calculating a three dimensional point on the contour line of the object on the basis of lines of sight of cameras which pass the pair of edge points.

14 Claims, 17 Drawing Sheets

(51) Int. Cl.
*H04N 5/247* (2006.01)
*G06T 7/593* (2017.01)

(56) References Cited

U.S. PATENT DOCUMENTS

2014/0012416 A1* 1/2014 Negishi .................. B25J 9/1607
  700/251
2014/0294286 A1 10/2014 Kitajima
2015/0005923 A1 1/2015 Gu

FOREIGN PATENT DOCUMENTS

| CN | 103999125 A | 8/2014 |
| JP | 2001-183133 A | 7/2001 |
| JP | 2009-2761 A | 1/2009 |
| JP | 2011-123051 A | 6/2011 |
| JP | 2012-42396 A | 3/2012 |
| JP | 2012-202732 A | 10/2012 |
| JP | 5093653 B2 | 12/2012 |
| JP | 2013-130508 A | 7/2013 |
| JP | 2015-009324 A | 1/2015 |

* cited by examiner

CONTOUR LINE MEASUREMENT APPARATUS AND ROBOT SYSTEM

RELATED APPLICATIONS

The present application claims priority to Japanese Application Number 2014-190182, filed Sep. 18, 2014, the disclosure of which is hereby incorporated by reference herein in its entirety.

BACKGROUND OF THE INVENTION

1. Field of the Invention

The present invention relates to a contour line measurement apparatus for measuring a three dimensional contour line shape of an object by using a stereo camera, and a robot system.

2. Description of the Related Art

To perform various operations on a workpiece by using an industrial robot, recognizing a three dimensional contour line shape of the workpiece is required. When the workpiece has no individual difference, information on a contour line shape of the workpiece can be obtained on the basis of design data. However, for example, when the workpiece is a cast, the workpiece has an individual difference for each casting mold, and consequently measuring a contour line shape of each workpiece is required.

Regarding this point, conventionally, an apparatus in which accurate three dimensional contour line information is obtained by a stereo method using two cameras (for example, Japanese Laid-open Patent Application No. 2012-202732 and Japanese Laid-open Patent Application No. 2013-130508). In apparatuses disclosed in Japanese Laid-open Patent Application No. 2012-202732 and Japanese Laid-open Patent Application No. 2013-130508, two cameras each capture a picture of a workpiece from positions different from each other, and from a pair of pictures thus obtained, each edge line (image of contour line) is extracted. Subsequently, intersections of epipolar line each obtained on the same epipolar plane and the edge line on each picture are determined. Then, the intersections on each picture are associated with each other, and these corresponding points are used to determine a position of three dimensional points on a contour line of the workpiece.

However, in the apparatuses disclosed in these Patent Documents, when there are a plurality of edge lines which intersect with the epipolar line, the lack of one-to-one correspondence between intersections in each picture makes determining the corresponding points difficult.

SUMMARY OF INVENTION

A contour line measurement apparatus of an embodiment of the present invention includes a first camera and a second camera which capture a picture of an object to obtain a first object picture and a second object picture, respectively. The contour line measurement apparatus includes an epipolar plane generation unit for generating, on the basis of a position and posture of the first camera and the second camera, a plurality of epipolar planes so as to cross the object, and an epipolar line calculation unit for calculating a plurality of first epipolar lines in which the plurality of epipolar planes are projected on an imaging surface of the first camera and a plurality of second epipolar lines in which the plurality of epipolar planes are projected on an imaging surface of the second camera. The contour line measurement apparatus includes a reference contour line setting unit for setting a three dimensional reference contour line of the object, a reference contour line image calculation unit for calculating a first reference contour line image and a second reference contour line image in which the reference contour line is projected on the imaging surface of the first camera and the imaging surface of the second camera, respectively. The contour line measurement apparatus includes an edge line extraction unit which sets a first picture processing region in the vicinity of the first reference contour line image and extracts, from the first object picture in the first picture processing region, a first edge line which is an image of a contour line of the object, while setting a second picture processing region in the vicinity of the second reference contour line image and extracting, from the second object picture in the second picture processing region, a second edge line which is an image of the contour line of the object. The contour line measurement apparatus includes an edge point generation unit for generating a plurality of first edge points which are intersections of the first edge line and the plurality of first epipolar lines and a plurality of second edge points which are intersections of the second edge line and the plurality of second epipolar lines, and a corresponding point selection unit for selecting, from the plurality of first edge points and the plurality of second edge points, a pair of edge points consisting of the first edge point and the second edge point which are generated by using the same epipolar plane and correspond to the same portion of the reference contour line. The contour line measurement apparatus includes a three dimensional point calculation unit for calculating a three dimensional point on the contour line of the object on the basis of a visual line of the first camera and a visual line of the second camera which pass the pair of edge points.

A contour line measurement apparatus of another embodiment of the present invention includes a first camera and a second camera which capture a picture of an object to obtain a first object picture and a second object picture, respectively. The contour line measurement apparatus includes a reference contour line setting unit for setting a three dimensional reference contour line of the object, and a reference contour line image calculation unit for calculating a first reference contour line image and a second reference contour line image in which the reference contour line is projected on the imaging surface of the first camera and the imaging surface of the second camera, respectively. The contour line measurement apparatus includes an edge line extraction unit which sets a first picture processing region in the vicinity of the first reference contour line image and extracts, from the first object picture in the first picture processing region, a first edge line which is an image of a contour line of the object, while setting a second picture processing region in the vicinity of the second reference contour line image and extracting, from the second object picture in the second picture processing region, a second edge line which is an image of the contour line of the object. The contour line measurement apparatus includes a first edge point generation unit for generating a plurality of first edge points on the first edge line, an epipolar plane generation unit for generating, on the basis of a position and posture of the first camera and the second camera, a plurality of epipolar planes passing the plurality of first edge points respectively, and an epipolar line calculation unit for calculating a plurality of epipolar lines in which the plurality of epipolar planes are projected on the imaging surface of the second camera. The contour line measurement apparatus includes a second edge point generation unit for generating a plurality of second edge points which are intersections of the plurality of epipolar lines and the second edge line, and a corresponding point selection unit for selecting, from the plurality of first edge points and the plurality of second edge points, a pair of edge points consisting of the first edge point and the second edge point which are generated by using the first edge point and correspond to the same portion of the reference contour line. The contour line measurement apparatus includes a three dimensional point calculation unit for calculating a three dimensional point on the contour line of the object on the basis of a visual line of the first camera and a visual line of the second camera which pass the pair of edge points.

Another embodiment of the present invention is a robot system includes a robot, a robot control unit for controlling the robot, and the above contour line measurement apparatus, in which the first camera and the second camera which are included in the contour line measurement apparatus are attached to an arm head portion of the robot, or an object of which a picture is captured by the first camera and the second camera is held by the arm head portion of the robot.

BRIEF DESCRIPTION OF THE DRAWINGS

The objects, features, and advantages of the present invention will become apparent from the following description of embodiments of the present invention taken in conjunction with the accompanying drawings. In the accompanying drawings.

DETAILED DESCRIPTION

First Embodiment

Figure 1:
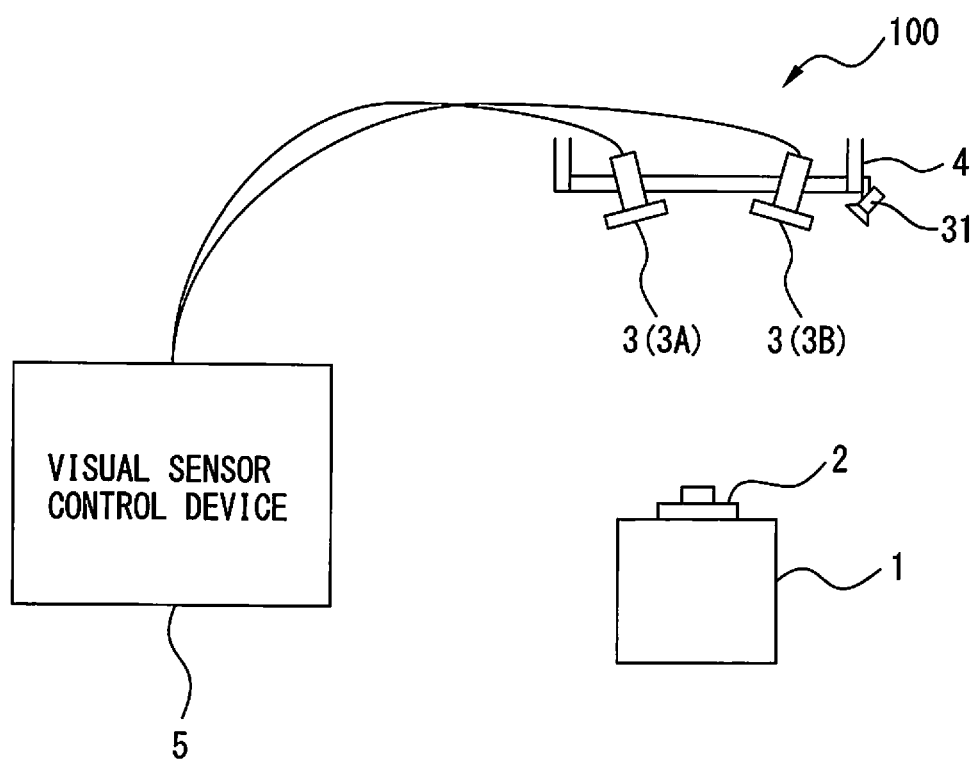
FIG. 1 is a diagram illustrating a principal configuration of a contour line measurement apparatus according to a first embodiment of the present invention.

Hereinafter, a first embodiment of the present invention will be described with reference to FIGS. 1 to 13. FIG. 1 is a diagram illustrating a principal configuration of a contour line measurement apparatus 100 according to the first embodiment of the present invention. The contour line measurement apparatus 100 includes a pair of cameras 3 (first camera 3A and second camera 3B) for imaging a workpiece 2 as an object placed on a work bench 1, and a visual sensor control device 5 which communicates with the first camera 3A and the second camera 3B to calculate a contour line shape of the workpiece 2. Note that a shape of the workpiece 2 is defined by a contour line (contour line 2a in FIG. 5). Accordingly, a contour line shape is calculated so as to specify a workpiece shape.

The cameras 3 are electronic cameras having an imaging element, such as a charge coupled device (CCD), and a well-known light receiving device having a function in which an imaging surface (on a CCD array surface) detects a two dimensional picture by capturing a picture. Note that a two dimensional coordinate system of the imaging surface is hereinafter referred to as sensor coordinate system. The first camera 3A and the second camera 3B are each supported on a stand 4. A position and a posture of the pair of cameras 3A and 3B in a three dimensional world coordinate system are determined so that a distance between the first camera 3A and the workpiece 2 and a distance between the second camera 3B and the workpiece 2 are substantially equal to each other. Moreover, the position and the posture of the pair of cameras 3A and 3B in a three dimensional world coordinate system are determined so that the first camera 3A and the second camera 3B can capture a picture in areas substantially identical to each other (see FIG. 5). Note that the three dimensional world coordinate system is hereinafter referred to as robot coordinate system.

Figure 2:
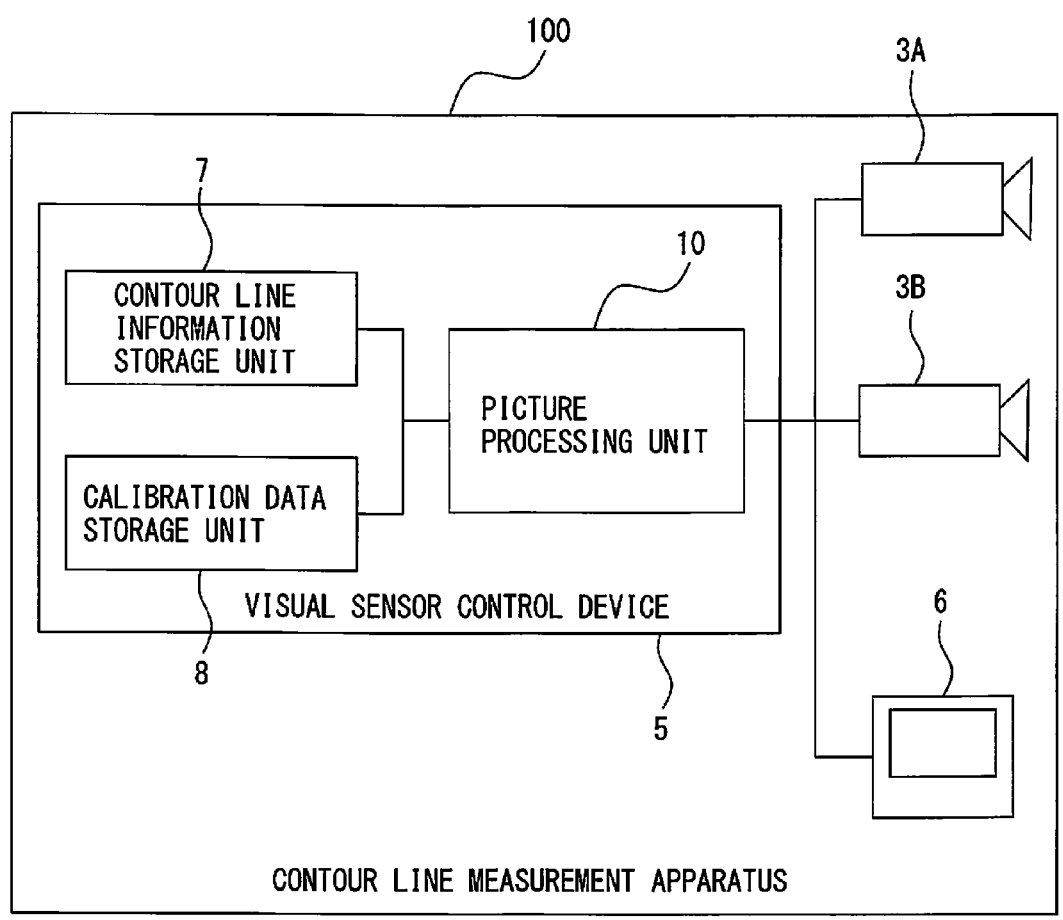
FIG. 2 is a block diagram illustrating a control configuration of the contour line measurement apparatus in FIG. 1.

FIG. 2 is a block diagram illustrating a control configuration of the contour line measurement apparatus 100 in FIG. 1. As illustrated in FIG. 2, the contour line measurement apparatus 100 includes the pair of cameras 3A and 3B, the visual sensor control device 5, and further a visual sensor operation console 6. The visual sensor operation console 6 inputs to the visual sensor control device 5 various instructions. The visual sensor control device 5 is configured to include an arithmetic processing unit including a central processing unit (CPU), a read only memory (ROM), a random access memory (RAM), the other peripheral circuits, and the like. The visual sensor control device 5 includes, as a functional configuration, a contour line information storage unit 7, a calibration data storage unit 8, and a picture processing unit 10.

The contour line information storage unit 7 stores in advance a contour line of the workpiece 2 as a reference, i.e., three dimensional shape information and position information of a reference contour line. The reference contour line is determined by a design value. The visual sensor control device 5 can directly read from outside the three dimensional shape information of the reference contour line, for example, in a predetermined file format. Note that the visual sensor control device 5 may read from outside three dimensional CAD data of the workpiece 2, and a user may specify a position of the contour line of the workpiece 2 via the visual sensor operation console 6 to determine the three dimensional shape information.

The three dimensional shape information of the reference contour line is determined by defining, for example, one coordinate system on the workpiece 2 (workpiece coordinate system) and representing positions of points and lines which constitute the reference contour line in coordinate data based on the workpiece coordinate system. In this case, a position and posture of the workpiece coordinate system relative to the robot coordinate system, i.e., a position of the origin of the workpiece coordinate system in the robot coordinate system and a posture of the workpiece coordinate system at the position, corresponds to the position information of the reference contour line.

The calibration data storage unit 8 stores in advance calibration data of the pair of cameras 3A, 3B. Note that methods for determining calibration data and formats of calibration data are well known, and thus the description on this point is omitted. When the calibration data is determined for a camera, a position of a three dimensional point in the robot coordinate system (referred to as gaze point) on a picture of the camera, i.e., a two dimensional point in the sensor coordinate system can be calculated. Further, when an image of the gaze point is determined as the two dimensional point in the sensor coordinate system, a visual line which is a three dimensional straight line passing the gaze point in the robot coordinate system and a focal point of the camera can be calculated.

Further, when the calibration data of each of the pair of cameras 3A, 3B is determined, provided that a three dimensional position of the gaze point in the robot coordinate system is determined, a plane passing the gaze point, a focal point of the first camera 3A, and a focal point of the second camera 3B, i.e., an epipolar plane (see FIG. 6) can be calculated. In addition, when the image of the gaze point is determined as a two dimensional point in the sensor coordinate system of the first camera 3A and a two dimensional point in the sensor coordinate system of the second camera 3B, a three dimensional position of the gaze point in the robot coordinate system can be calculated.

Figure 3:
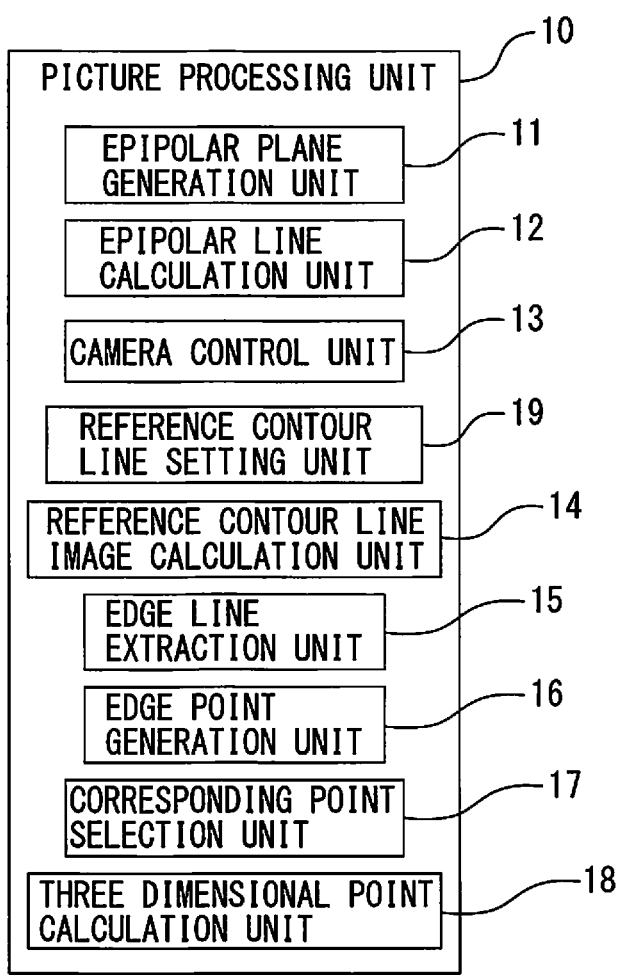
FIG. 3 is a block diagram illustrating a detailed configuration of a picture processing unit in FIG. 2.

The picture processing unit 10 executes a predetermined processing (contour line measurement processing) on the basis of signals from the first camera 3A, the second camera 3B, the contour line information storage unit 7, the calibration data storage unit 8, and the visual sensor operation console 6. Thereby, the picture processing unit 10 determines a two dimensional point in the sensor coordinate system of the first camera 3A which corresponds to a three dimensional point on the contour line of the workpiece 2 (measurement point) and a two dimensional point in the sensor coordinate system of the second camera 3B which corresponds to the same measurement point, i.e., a pair of corresponding points. Further, the picture processing unit 10 calculates a three dimensional position of the measurement point in the robot coordinate system by using the pair of corresponding points. FIG. 3 is a block diagram illustrating a detailed configuration of the picture processing unit 10, and FIG. 4 is a flowchart illustrating an example of a processing executed in the picture processing unit 10.

As illustrated in FIG. 3, the picture processing unit 10 includes an epipolar plane generation unit 11, an epipolar line calculation unit 12, a camera control unit 13, a reference contour line setting unit 19, a reference contour line image calculation unit 14, an edge line extraction unit 15, an edge point generation unit 16, a corresponding point selection unit 17, and a three dimensional point calculation unit 18.

Figure 4:
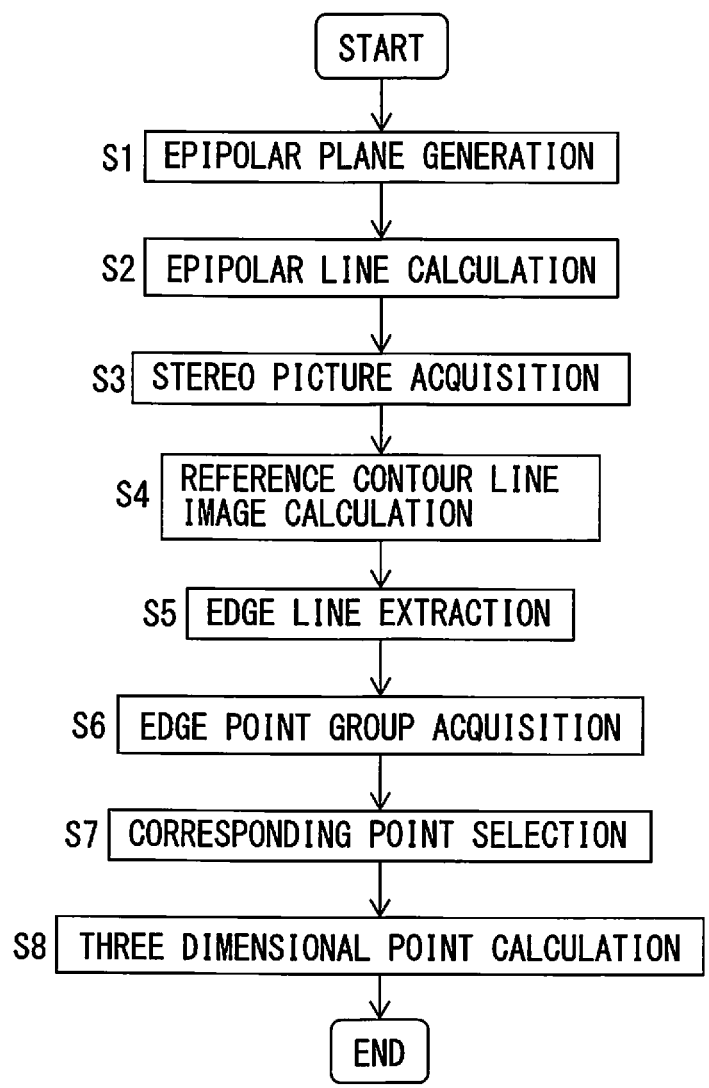
FIG. 4 is a flowchart illustrating an example of a processing executed in the picture processing unit in FIG. 3.
Figure 5:
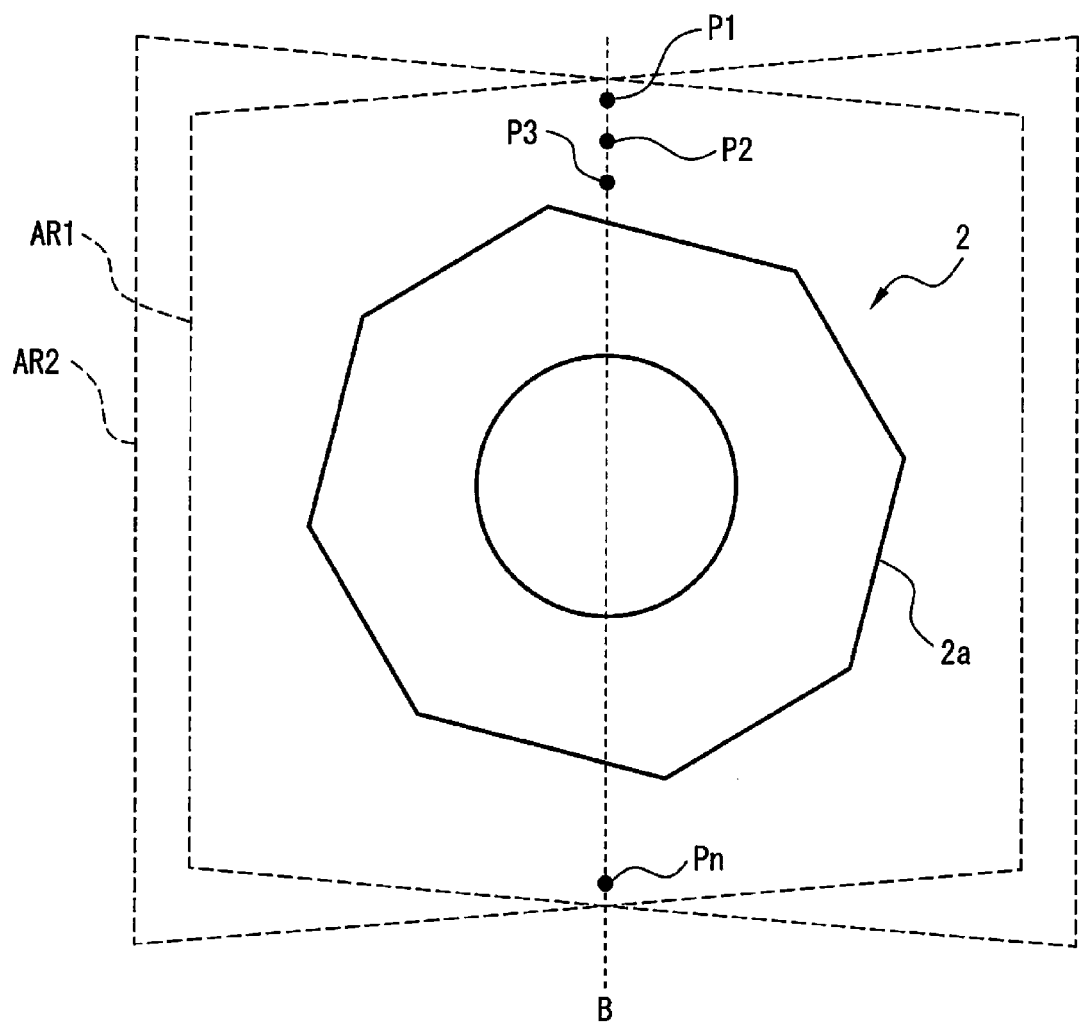
FIG. 5 is a plan view of a workpiece which is an object to be measured by the contour line measurement apparatus according to a first embodiment of the present invention.

A contour line measurement processing illustrated in FIG. 4 is started when a user inputs an instruction of measuring the contour line of the workpiece 2 via, for example, the visual sensor operation console 6. Note that, hereinafter, on condition that the workpiece 2 is disposed adjacent to a position indicated by the position information stored in the contour line information storage unit 7, the processing in FIG. 4 will be described. FIG. 5 is a plan view of the workpiece 2 illustrating an example of a contour line 2a. A surface of the workpiece 2 in FIG. 5 faces the cameras 3A, 3B, and in FIG. 5, an image capture area AR1 of the first camera 3A and an image capture area AR2 of the second camera 3B are projected to be illustrated. The image capture areas AR1, AR2 are substantially equal to each other, and contain the entirety of the workpiece 2.

Figure 6:
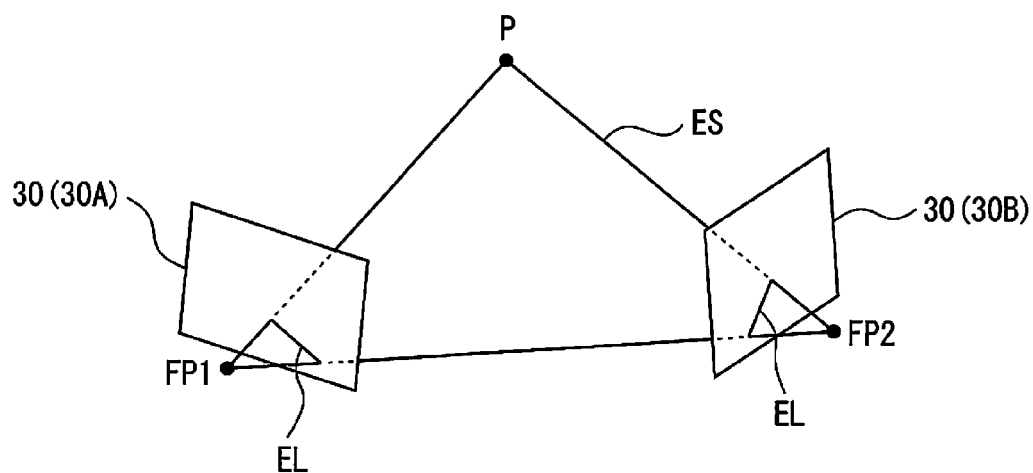
FIG. 6 is a diagram illustrating an example of epipolar planes.

In a step S1, through a processing in the epipolar plane generation unit 11, a plurality of epipolar planes ES which cross the workpiece 2 are generated in a common visual field of the first camera 3A and the second camera 3B. FIG. 6 is a diagram illustrating an example of the epipolar planes ES. Note that, in FIG. 6, the imaging surfaces 30 (30A, 30B) of the cameras 3 are also illustrated. The number of epipolar planes ES is determined in consideration of density of the measurement points on the contour line 2a of the workpiece 2, calculation time required for calculating three dimensional positions of the measurement points, and the like. To generate the epipolar planes ES, at least the same number of gaze points P as the number of epipolar planes ES are to be set in a three dimensional space. The gaze points P are set, for example, in the following process. Note that, in the following, to simplify the description, an optical axis of the first camera 3A and an optical axis of the second camera 3B are assumed to cross with respect to each other at a point separated by an appropriate distance from the cameras 3A, 3B, respectively.

First, a sum (vector A) of a direction vector of the optical axis of the first camera 3A and a direction vector of the optical axis of the second camera 3B is calculated. Then, an intersection (intersection A) of the optical axis of the first camera 3A and the optical axis of the second camera 3B is calculated. Then, a plane (plane A) formed by the optical axis of the first camera 3A and the optical axis of the second camera 3B is calculated. Then, a plane (plane B) passing the intersection A and having the vector A as normal line is calculated. Then, a line of intersection (straight line A) of the plane A and the plane B is calculated. Then, a straight line (straight line B) which is on the plane B, passes the intersection A, and intersects at right angles to the straight line A is calculated. Lastly, as illustrated in FIG. 5, the gaze points P (P1, P2 . . . , Pn) are generated on the straight line B with a predetermined space therebetween. With respect to each gaze point P, as illustrated in FIG. 6, the epipolar plane ES passing the focal point FP1 of the first camera 3A and the focal point FP2 of the second camera 3B is generated.

Figure 7:
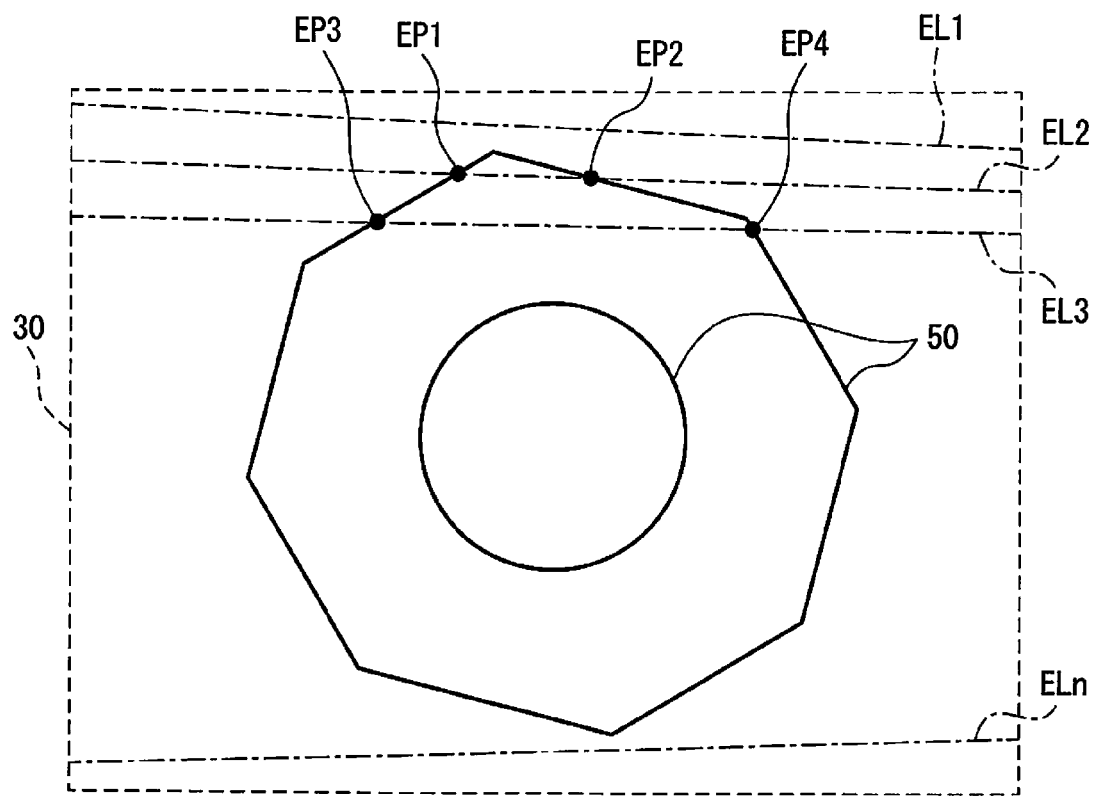
FIG. 7 is a diagram illustrating an example of epipolar lines.

In a step S2, through a processing in the epipolar line calculation unit 12, the epipolar line EL of each of the plurality of epipolar planes ES generated in the step S1 is calculated. In other words, as illustrated in FIG. 6, the epipolar plane ES is projected on each of the imaging surface 30A of the first camera 3A and the imaging surface 30B of the second camera 3B to calculate the epipolar line EL. This is performed with respect to the plurality of epipolar planes ES to obtain the plurality of epipolar lines EL. FIG. 7 is a diagram illustrating an example of the plurality of epipolar lines EL (EL1, EL2 . . . , ELn) on the imaging surface 30 of one of the cameras 3.

Note that, when the position relationship of the pair of cameras 3A, 3B and the focal distance of each of cameras 3A, 3B are not changed, the epipolar planes ES generated in the step S1 and the epipolar lines EL calculated in the step S2 may not be determined again. Thus, the once generated epipolar planes ES and the once calculated epipolar lines EL may be stored, for example, in a storage device inside or outside the visual sensor control device 5, and may be read when measuring the contour line of the workpiece 2 is performed. Thereby, calculation for determining the epipolar planes ES and the epipolar lines EL can be omitted, and a contour line shape can be measured at a high speed.

In a step S3, through a processing in the camera control unit 13, a control signal is output to the cameras 3A, 3B, and the first camera 3A and the second camera 3B are made to capture a picture of the workpiece 2. The first camera 3A captures a picture of the workpiece 2, and captures a first workpiece picture as a first object picture. The second camera 3B captures a picture of the workpiece 2, and captures a second workpiece picture as a second object picture. Thereby, the imaging surfaces 30A, 30B of the cameras 3A, 3B, respectively, each obtains a picture (workpiece picture).

In a step S4, the reference contour line setting unit 19 sets the three dimensional reference contour line of the workpiece 2, for example, on the basis of the three dimensional shape information and the position information of the reference contour line. Then, through processing in the reference contour line image calculation unit 14, the reference contour line of the workpiece 2 which is stored in the contour line information storage unit 7 is projected on each of the picture of the first camera 3A and the picture of the second camera 3B to calculate a reference contour line image 40 (see FIG. 8). Specifically, first, a plurality of three dimensional points are set on the reference contour line with a predetermined space therebetween. For example, a plurality of three dimensional points are set in the workpiece coordinate system, and then a coordinate of the three dimensional points is converted into a coordinate in the robot coordinate system, thereby setting the plurality of three dimensional points. Then, the plurality of three dimensional points are projected on the picture of each of the cameras 3A, 3B to determine a plurality of two dimensional points on the sensor coordinate system. The plurality of two dimensional points thus obtained are connected one by one to each other to obtain the reference contour line image 40.

Figure 8:
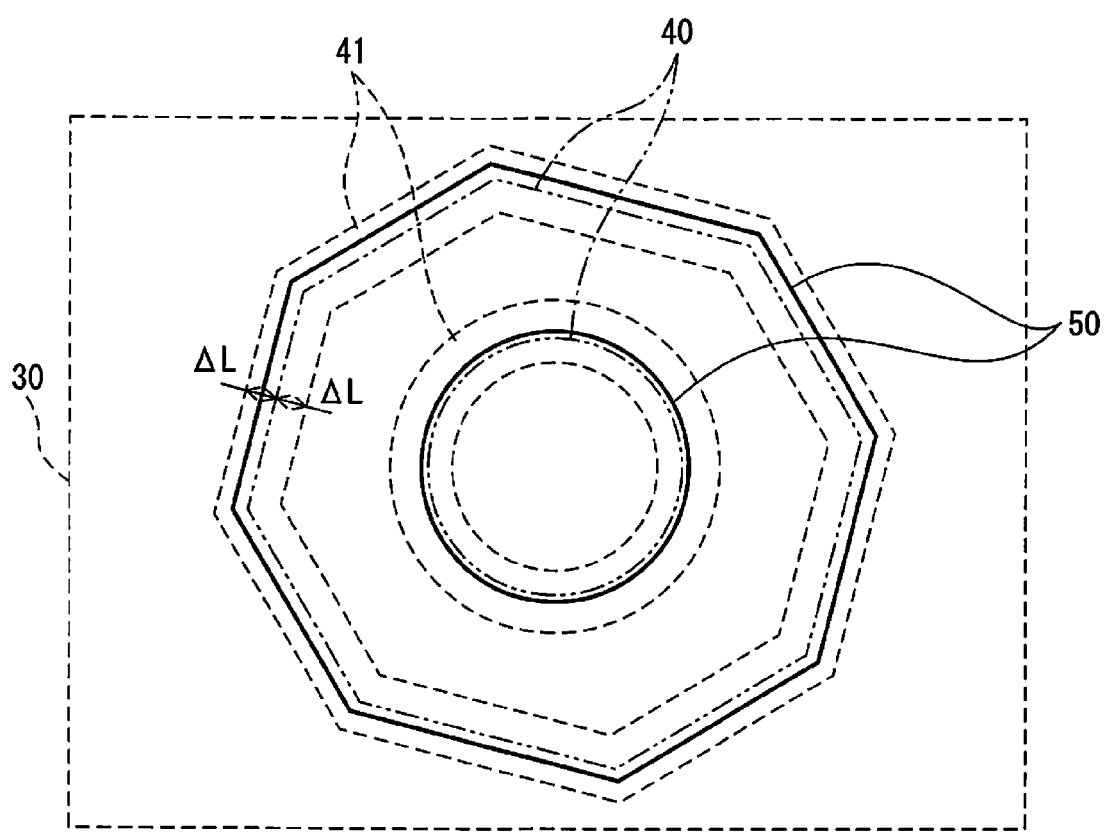
FIG. 8 is a diagram illustrating an example of an edge line.

In a step S5, through a processing in the edge line extraction unit 15, an edge line 50 is extracted from the picture of each of the cameras 3A, 3B. The edge line 50 is a set of line segments in which portions displaying a large amount of change in luminance value in the picture are connected to each other. The edge line 50 can be extracted by using a Sobel filter or Canny edge detector. FIG. 8 is a diagram illustrating an example of the edge line 50 on the picture in the imaging surface 30.

When the edge line 50 is extracted, first, as illustrated in FIG. 8, an edge line detection region 41 is set adjacently to the reference contour line image 40, for example, within a predetermined distance ΔL from the reference contour line image 40. The predetermined distance ΔL may be stored in advance in a memory in the visual sensor control device 5 or set via the visual sensor operation console 6. In addition, even when the predetermined distance ΔL constant over the entire reference contour line image 40, changes may be made depending on a part of the reference contour line image 40.

The edge line extraction unit 15 searches the edge line 50 from the picture in the edge line detection region 41 to perform extraction. A search region of the edge line 50 is restricted in this manner, thereby producing an effect of preventing objects other than the contour line of the workpiece as detection object from being extracted as the edge line 50. In addition, an effect in which the edge line 50 can be extracted at a high speed is also produced. The plurality of edge lines 50 connected to each other represent an actual image of the contour line of the workpiece 2. Note that there is a divergence between the reference contour line and the actual contour line of the workpiece 2 due to an individual difference of the workpiece 2, a divergence in position information, and the like so that, in FIG. 8, a divergence between the reference contour line image 40 and the edge lines 50 occurs.

In a step S6, through a processing in the edge point generation unit 16, an intersection of the edge line 50 on each picture which is extracted in the step S5 and the epipolar line EL is calculated to obtain an edge point EP. On the picture of each of the cameras 3A, 3B, the plurality of edge points EP are obtained. Hereinafter, the plurality of edge points EP on the picture of the first camera 3A are referred to as a first edge point group, and the plurality of edge points EP on the picture of the second camera 3B are referred to as a second edge point group.

Note that, in FIG. 7, the plurality of edge lines 50 cross the epipolar line EL, and the plurality of edge points EP (EP1 and EP2, EP3 and EP4) are generated on the same epipolar plane ES. In this embodiment, since an error in regard to the edge point EP increases at a part in which the edge line 50 and the epipolar line EL are nearly parallel to each other, the edge point generation unit 16 does not generate an edge point at such a part.

In a step S7, through a processing in the corresponding point selection unit 17, from the first edge point group and the second edge point group obtained in the step S6, one edge point EP of the first edge point group and one edge point EP of the second edge point group which corresponds to each other are selected in the each group. Hereinafter, the selected pair of edge points EP, i.e., the edge point EP selected from the first edge point group (first edge point) and the edge point EP selected from the second edge point group (second edge point) are each referred to as corresponding points, and a combination of the first edge point EP and the second edge point EP is referred to as edge point pair. Selecting the edge point pair is performed in the following manner, for example.

First, from the first edge point group and the second edge point group, the edge points EP on the same epipolar plane ES are extracted. The extracted edge points EP are candidates for the edge point pair. When the first edge point EP extracted from the first edge point group and the second edge point EP extracted from the second edge point group each consist of one point, the edge points EP correspond one-to-one to each other on the same epipolar plane ES, and consequently are determined to be the edge point pair. Note that when at least one of the first edge point EP extracted from the first edge point group and the second edge point EP extracted from the second edge point group does not exist, the edge points EP fail to correspond to each other on the same epipolar plane ES, and consequently no edge point pair is made.

Figure 9:
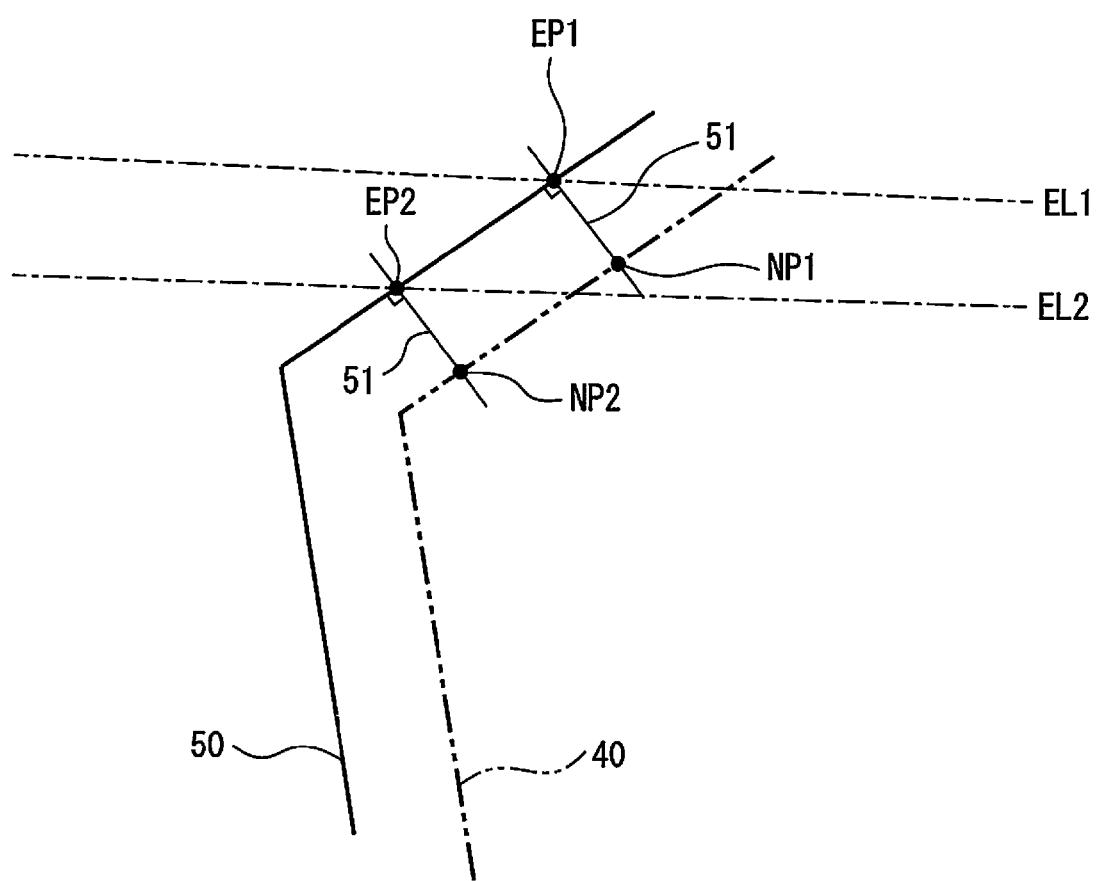
FIG. 9 is a diagram illustrating an example of nearest points.
Figure 10:
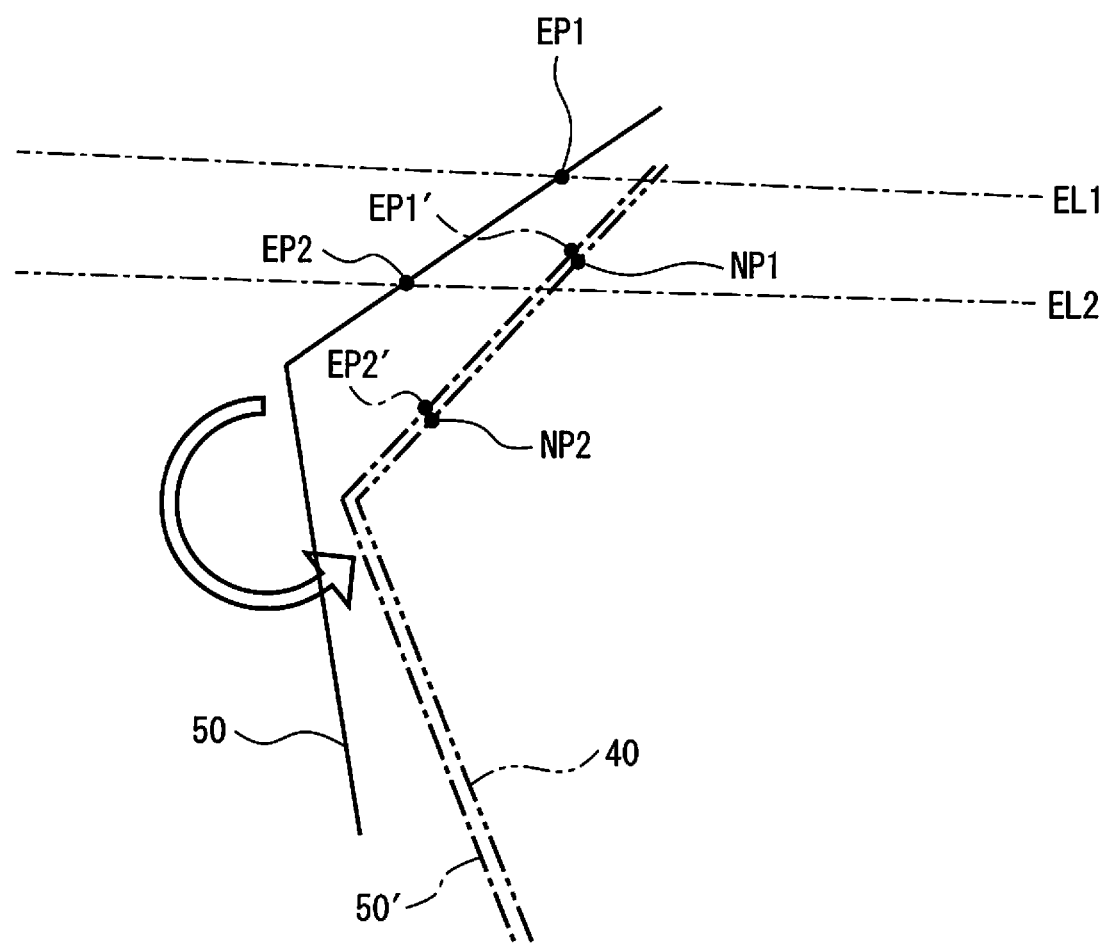
FIG. 10 is a diagram illustrating a modified example of FIG. 9.

On the other hand, when at least one of the first edge point EP extracted from the first edge point group and the second edge point EP extracted from the second edge point group consists of plural points, nearest points NP on the reference contour line image 40 which corresponds to edge point EP is determined. FIG. 9 is a diagram illustrating an example of the nearest points NP (NP1, NP2). The nearest point NP is a point on the reference contour line image 40 to which a distance from the edge point EP is the smallest, and, for example, as illustrated in FIG. 9, intersections of perpendicular lines 51 passing the edge points EP1, EP2 relative to the edge line 50 and the reference contour line image 40 are the nearest points NP1, NP2. From the intersections as starting points, a point on the reference contour line image 40 to which a distance from the edge point EP is the smallest may be searched, and determined to be the nearest point NP. As illustrated in FIG. 10, the entirety of the edge line 50 may be displaced in a parallel and/or rotational manner so that the edge line 50 corresponds to the reference contour line image 40, and then points from which a distance from the edge points EP1', EP2' on the edge line 50' thus displaced may be determined to be the nearest points NP1, NP2.

Subsequently, a first projection base point which is an intersection of a visual line of the first camera 3A passing the nearest point NP on the picture of the first camera 3A and the reference contour line of the workpiece 2 is calculated, and a second projection base point which is an intersection of a visual line of the second camera 3B passing the nearest point NP on the picture of the second camera 3B and the reference contour line is calculated. In this case, since at least one of the first edge point EP and the second edge point EP consists of plural points, at least one of the first projection base point and the second projection base point consists of plural points, one of which in which a distance between the first projection base point and the second projection base point (inter-projection base point distance) is less than a predetermined value a is selected for the edge point pair.

Note that the inter-projection base point distance may be a straight line distance between the first projection base point and the second projection base point, and alternatively may be a length of the reference contour line between the first projection base point and the second projection base point. The predetermined value a is a threshold value for determining whether or not the nearest points NP on the corresponding pictures of the cameras 3A, 3B each represent the same portion of the reference contour line. When there are the plurality of edge point pairs in which the inter-projection base point distance is less than the predetermined value a, one of which in which the inter-projection base point distance is the smallest may be selected for the edge point pair. When there are the plurality of ones in which the inter-projection base point distances thereof are close to each other, the edge point pair may be selected also in consideration of a distance between the nearest point NP and the edge point EP.

When the first edge point EP extracted from the first edge point group and the second edge point EP extracted from the second edge point group each consists of one point, the inter-projection base point distance may be calculated in a manner similar to the above, and the edge point pair may be selected on condition that the inter-projection base point distance is smaller than the predetermined value a. Thereby, estimating whether or not the first edge point EP and the second edge point EP favorably correspond to each other, i.e., estimating whether or not these are the effective edge point pair can be performed.

In a step S8, through a processing in the three dimensional point calculation unit 18, a visual line connecting the first edge point EP consisting of the edge point pair determined in the step S7 to the focal point of the first camera 3A and a visual line connecting the second edge point EP consisting of the edge point pair determined in the step S7 to the focal point of the second camera 3B are each calculated, and further an intersection (measurement point) of the two lines of sight is calculated. Thereby, a three dimensional position of the measurement point on the contour line of the workpiece 2 can be measured.

According to the first embodiment as described above, the nearest points NP are set on the picture so that, from the first edge point group and the second edge point group, a pair of the first edge point EP and the second edge point EP which are on the same epipolar plane ES and correspond to the same portion of the reference contour line are selected, a position of the measurement point in the robot coordinate system by using the edge point pair is specified, and a three dimensional position of the measurement point is calculated. Thereby, even when there are the plurality of edge lines 50 which cross the epipolar line EL and consequently there are a plurality of candidates for the edge point pair, the first edge point EP and the second edge point EP can be favorably made to correspond one-to-one to each other, and a three dimensional point on the contour line of the workpiece 2 can be accurately calculated.

In addition, in this embodiment, a comparatively simple configuration which includes two cameras allows the three dimensional contour line shape of the workpiece 2 to be determined. Further, capturing a picture by the cameras 3A, 3B may be once performed, thereby allowing measurement of the contour line shape to be performed at a high speed. Moreover, according to this embodiment, the position of the contour line can be determined, not only when the three dimensional contour line of the workpiece 2 is on a specific plane, but also when the three dimensional contour line fails to be on a plane.

Figure 11:
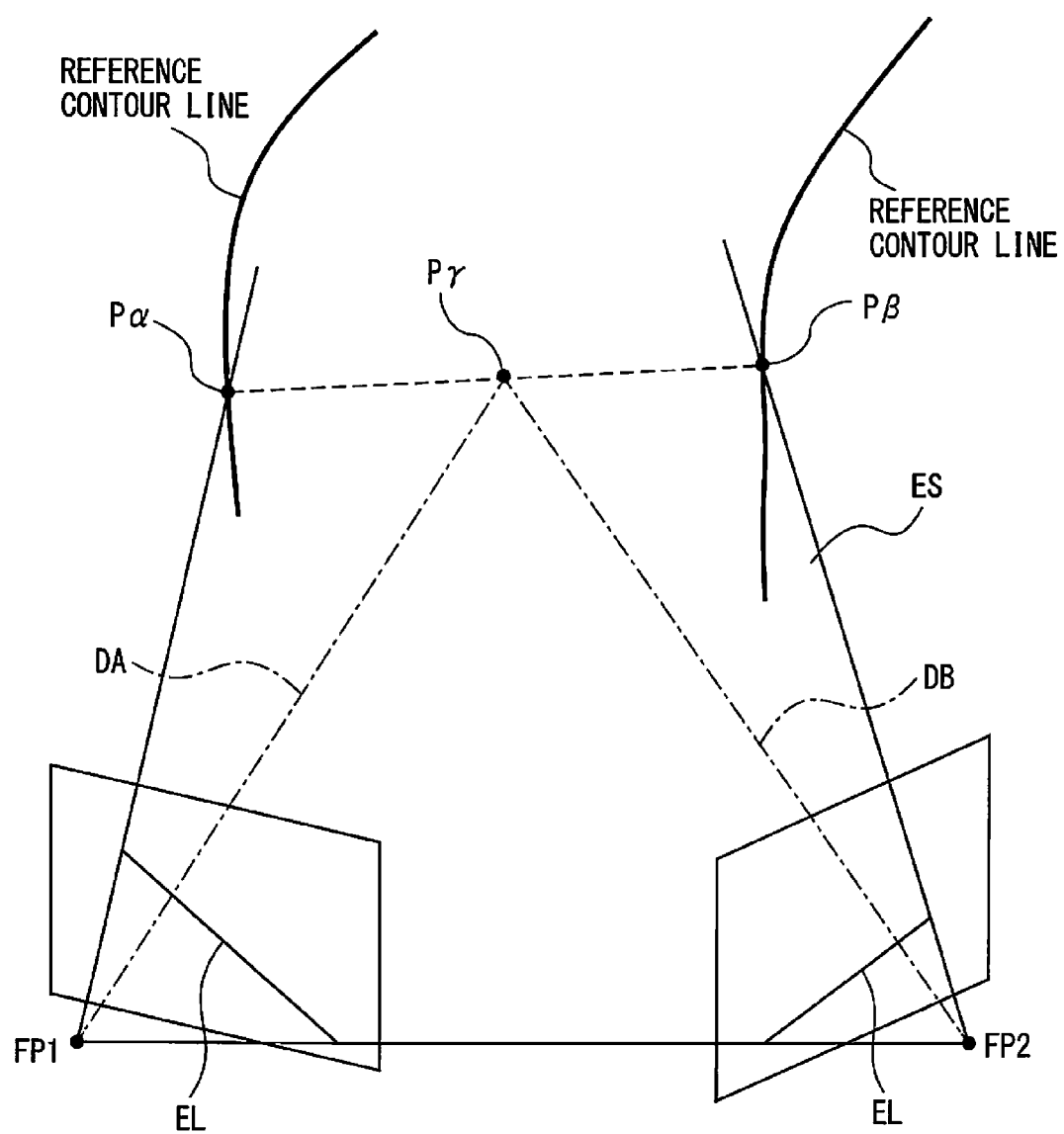
FIG. 11 is a diagram illustrating a method for dividing the epipolar plane.

The epipolar planes ES may also be divided in advance so that the points EP on the same epipolar plane ES correspond one-to-one as much as possible to each other in the corresponding point selection unit 17. FIG. 11 is a diagram illustrating a method for dividing the epipolar plane ES by a division line DA and a division line DB which correspond to the first camera 3A and the second camera 3B, respectively. First, with respect to each of the plurality of epipolar planes ES, intersections Pα, Pβ with the reference contour line are calculated. When there is only one intersection, or there is no intersection, an advance to the following step is subsequently made. When there are the plural intersections, every middle point Pγ between the intersections Pα, Pβ adjacent to each other on the epipolar plane is determined, and the epipolar plane ES is divided by the division lines DA, DB which connect each middle point Pγ to the focal point FP1 of the first camera 3A and the focal point FP2 of the second camera 3B, respectively.

Figure 12:
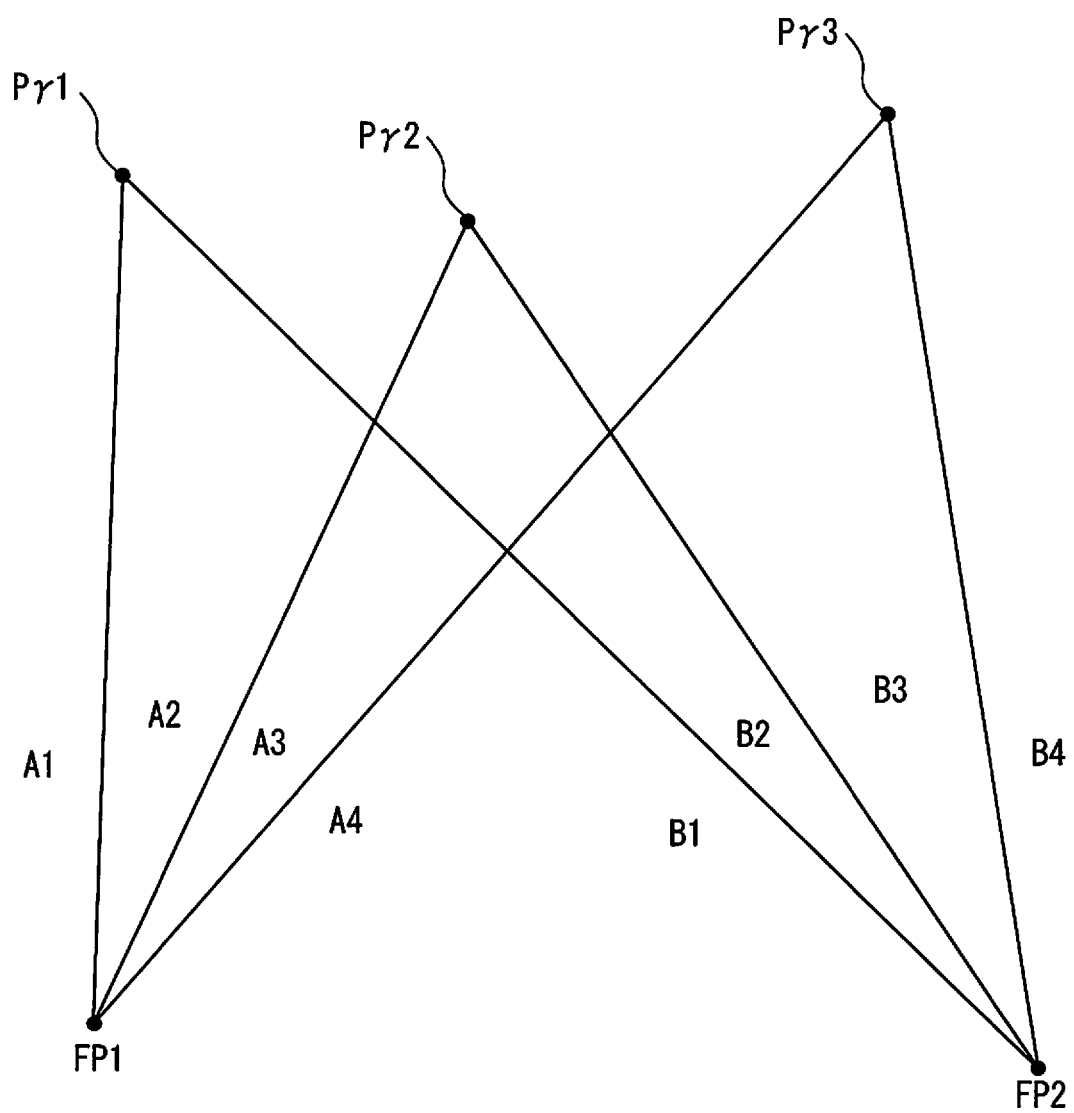
FIG. 12 is a diagram illustrating the divided epipolar plane.

The epipolar plane ES is divided by the division lines DA, DB different from each other with respect to the first camera 3A and the second camera 3B, and, as illustrated in FIG. 12, the epipolar plane of the first camera 3A and the epipolar plane of the second camera 3B which are divided by the same middle points Pγ1, Pγ2, Pγ3 are provided with similar indexes A1-A4, B1-B4, respectively, which are considered to be common thereto. The divided epipolar planes are each considered to be epipolar planes different from each other, and the edge points EP on the same divided epipolar plane ES are each extracted from the first edge point group and the second edge point group, thereby enabling limitation of the number of candidates for the corresponding points. Since it is obvious that effects of dividing the reference contour line or dividing an extraction region of the edge line 50 similar to those of dividing the epipolar planes ES can be obtained, the description thereof is omitted.

Figure 13:
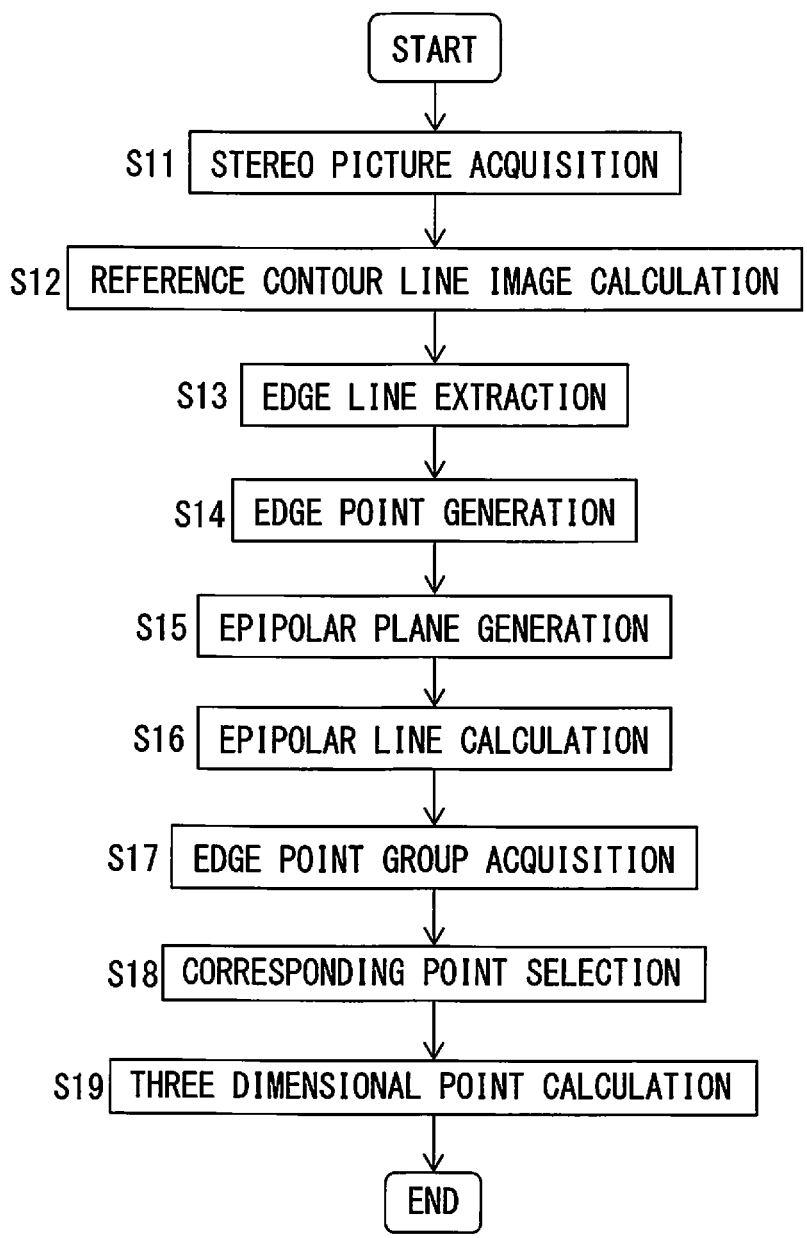
FIG. 13 is a flowchart illustrating a modified example of FIG. 4.

FIG. 13 is a flowchart illustrating a modified example of FIG. 4. In a step S11, in a manner similar to the step S3 in FIG. 4, through a processing in the camera control unit 13, the first camera and the second camera are made to perform an operation for capturing a picture, and a pair of pictures is obtained. In a step S12, in a manner similar to the step S4 in FIG. 4, through the processing in the reference contour line image calculation unit 14, the reference contour line is projected on the pair of pictures to calculate the reference contour line image 40. In a step S13, in a manner similar to the step S5 in FIG. 4, through the processing in the edge line extraction unit 15, the edge line 50 is extracted from the pair of pictures.

In a step 14, through a processing in the edge point generation unit 16, the plurality of edge points EP (first edge point group) are generated on the edge line 50 extracted from the picture of the first camera 3A with a predetermined space therebetween. In this case, the edge point generation unit 16 functions as a first edge point generation unit. First edge points EP are points as reference for determining three dimensional points on the contour line, and set to have a predetermined space therebetween in such a manner as to obtain the three dimensional points which are sufficiently dense.

In a step S15, through a processing in the epipolar plane generation unit 11, with respect to each of first edge points EP generated in the step S14, the plurality of epipolar planes ES passing the corresponding edge points EP and the focal points of the cameras 3A, 3B are generated.

In a step S16, through a processing in the epipolar line calculation unit 12, the plurality of epipolar planes ES generated in the step S15 are each projected on the imaging surface 30B of the second camera 3B, and the plurality of epipolar lines EL are calculated.

In a step S17, through a processing in the edge point generation unit 16, the plurality of second edge points EP (second edge point group) which are intersections of the plurality of epipolar lines EL generated in the step S16 and the edge line 50 are calculated. In this case, the edge point generation unit 16 functions as a second edge point generation unit.

In a step S18, through a processing in the corresponding point selection unit 17, the first edge point EP and the second edge point EP determined by generating the epipolar planes ES and the epipolar lines EL based on the first edge points EP are selected from the first edge point group and the second edge point group and determined to be the edge point pair.

In this case, when there are the plurality of first edge points EP and/or the plurality of second edge points EP on the same epipolar plane ES, in a manner similar to the above, the nearest point NP and the projection base point which correspond to each edge point EP are determined one by one, and further, the first edge point and the second edge point in which the inter-projection base point distance is less than the predetermined value a are determined to be the edge point pair. Thereby, the first edge point EP and the second edge point EP which correspond to the same portion of the reference contour line can be determined to be the edge point pair.

In a step S19, in a manner similar to the step S8 in FIG. 4, through a processing in the three dimensional point calculation unit 18, a three dimensional position of the measurement point on the contour line of the workpiece 2 is obtained by using the edge point pair calculated in the step S18.

Second Embodiment

Hereinafter, a second embodiment of the present invention will be described with reference to FIGS. 14 to 18. Note that, hereinafter, the parts identical to those in FIGS. 1 to 10 are indicated by the identical reference signs, and the difference from the first embodiment will be mainly described. The second embodiment relates to a robot system including the contour line measurement apparatus 100, in which at least one of the pair of cameras 3A, 3B or the workpiece 2 are provided in a movable manner by using a robot.

Figure 14:
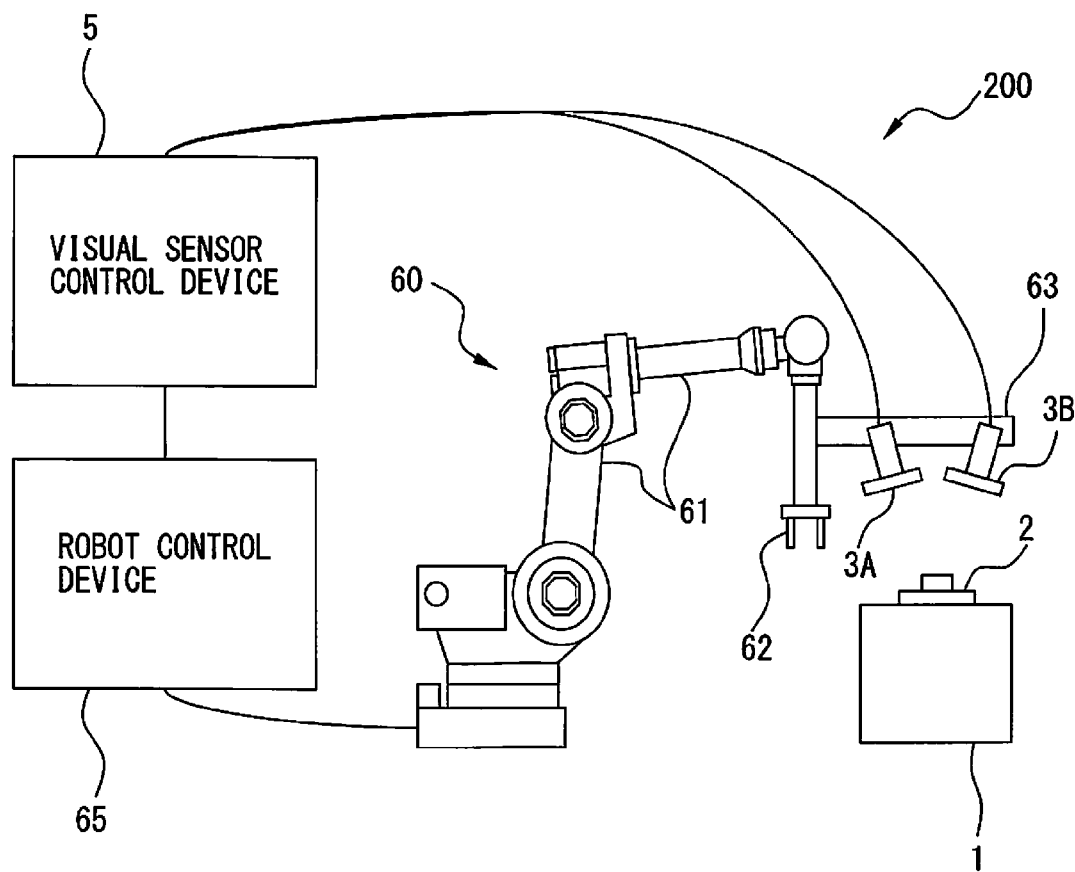
FIG. 14 is a diagram illustrating a principal configuration of a robot system according to a second embodiment of the present invention.

FIG. 14 is a diagram illustrating a principal configuration of a robot system 200 according to the second embodiment of the present invention. As illustrated in FIG. 14, the robot system 200 includes the pair of cameras 3A, 3B, the visual sensor control device 5 which communicates with the pair of cameras 3A, 3B to calculate the contour line shape of the workpiece 2, a robot 60 which supports the pair of cameras 3A, 3B, and a robot control device 65 for controlling the robot 60. Note that the pair of cameras 3A, 3B and the visual sensor control device 5 are included in the configuration of the contour line measurement apparatus 100. The robot control device has a function of a robot control unit. The visual sensor control device 5 includes, in a similar manner as in FIG. 2, the contour line information storage unit 7, the calibration data storage unit 8, and the picture processing unit 10.

The robot 60 is an articulated robot configured so that a plurality of arms 61 which are pivotable are connected to each other, in which an arm head portion has a hand 62. A bracket 63 is attached to the arm head portion of the robot 60, and the pair of cameras 3A, 3B are fixed on the bracket 63. Thereby, when the arm 61 is driven, the first camera 3A and the second camera 3B can be transferred in the three dimensional space while constantly maintaining a relative position and posture thereof, and a relative position and posture of the cameras 3A, 3B relative to the workpiece 2 can be changed.

The visual sensor control device 5 and the robot control device 65 are connected to each other by a well-known method, such as RS232C and local area network (LAN), and can communicate with each other. Thereby, the visual sensor control device 5 can obtain current position information of the robot 60 from the robot control device 65. Further, the robot control device 65 can obtain contour line shape information of the workpiece 2 from the visual sensor control device 5.

In the second embodiment different from the first embodiment, the cameras 3A, 3B can be transferred in the robot coordinate system. In consideration of this point, the calibration data storage unit 8 in the visual sensor control device 5 stores calibration data of the cameras 3A, 3B in a coordinate system (mechanical interface coordinate system) set on the arm head portion of the robot 60, i.e., calibration data in the mechanical interface coordinate system. Meanwhile, the robot control device 65 can recognize a position of the arm head portion in the robot coordinate system.

Thus, on the basis of the calibration data stored in the calibration data storage unit 8, a two dimensional point in the sensor coordinate system and a three dimensional point in the mechanical interface coordinate system are made to correspond to each other, and further the mechanical interface coordinate system is converted into the robot coordinate system in response to the position of the arm head portion recognized by the robot control device 65, thereby enabling the two dimensional point in the sensor coordinate system and the three dimensional point in the robot coordinate system to correspond to each other. In other words, a position and posture in the sensor coordinate system in view of the robot coordinate system can be determined. Thereby, in a manner similar to the first embodiment, a three dimensional point position of the contour line of the workpiece 2 can be measured by using picture data represented in the sensor coordinate system.

Note that the calibration data storage unit 8 may store the calibration data of the cameras 3A, 3B in the robot coordinate system as well as position information of the robot 60 during calibration execution. In this case, robot position information during workpiece picture capture and robot position information during calibration execution are used so that the position and posture in the sensor coordinate system in view of the robot coordinate system during workpiece picture capture can be determined.

Figure 15:
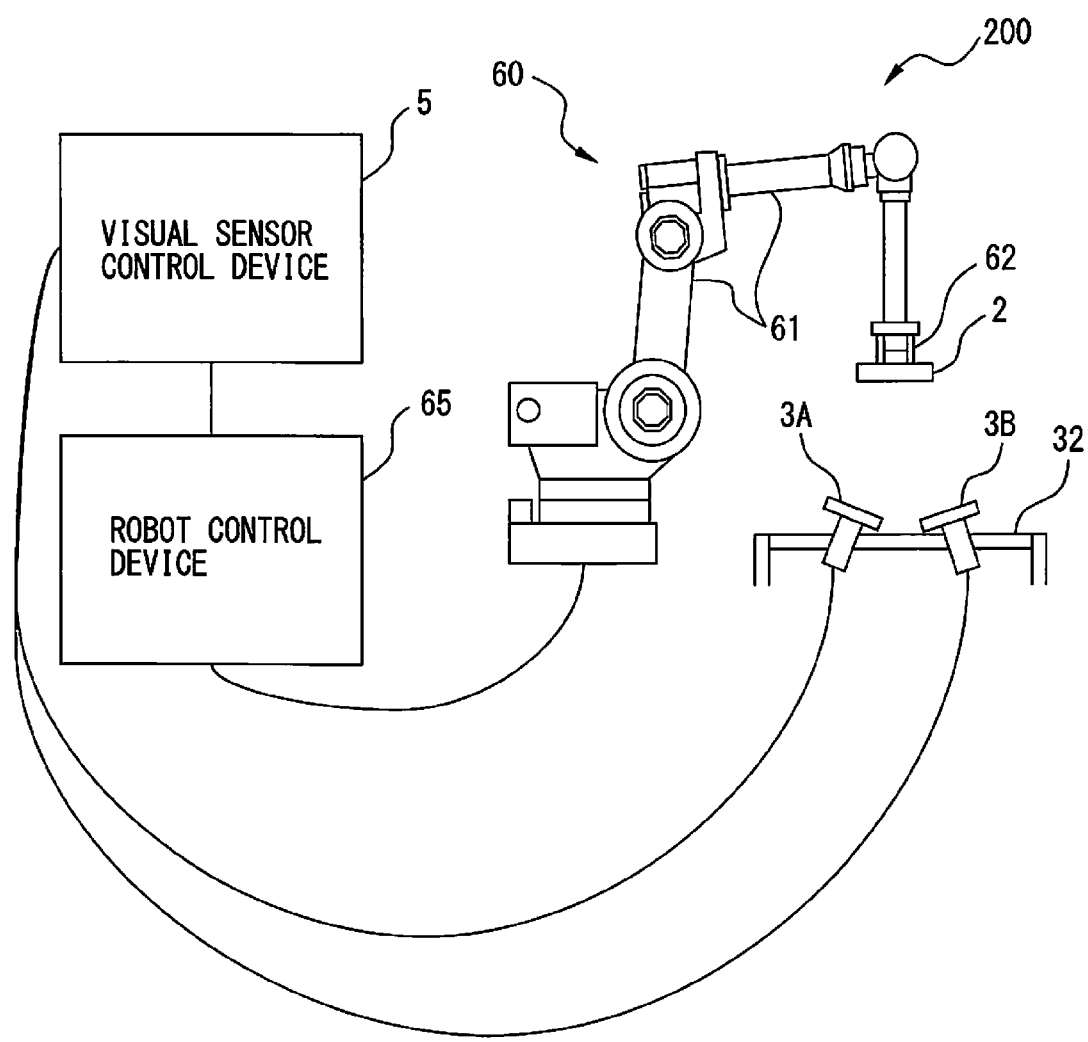
FIG. 15 is a diagram illustrating a modified example of FIG. 14.

By using the robot 60, the workpiece 2 in place of the cameras 3A, 3B may be configured to be transferable. FIG. 15 is a diagram illustrating an example of the same. In FIG. 15, the pair of cameras 3A, 3B is fixed on a work bench 32, and the workpiece 2 is held by the hand 62 of the arm head portion of the robot 60. Consequently, when the robot 60 is driven, the workpiece 2 is transferred, thereby enabling change of a relative position and posture of the workpiece 2 relative to the cameras 3A, 3B.

In this case, the contour line information storage unit 7 in the visual sensor control device 5 stores not the position and posture in the workpiece coordinate system in view of the robot coordinate system but the position and posture in the workpiece coordinate system in view of the mechanical interface coordinate system. The position and posture in the workpiece coordinate system in view of the mechanical interface coordinate system is converted in terms of coordinate on the basis of robot position information during workpiece picture capture so that, from the position and posture in the workpiece coordinate system in view of the mechanical interface coordinate system, the position and posture in the workpiece coordinate system in view of the robot coordinate system can be determined. Thereby, in a manner similar to the first embodiment, a three dimensional point position of the contour line of the workpiece 2 can be measured by using picture data represented in the sensor coordinate system.

Figure 16:
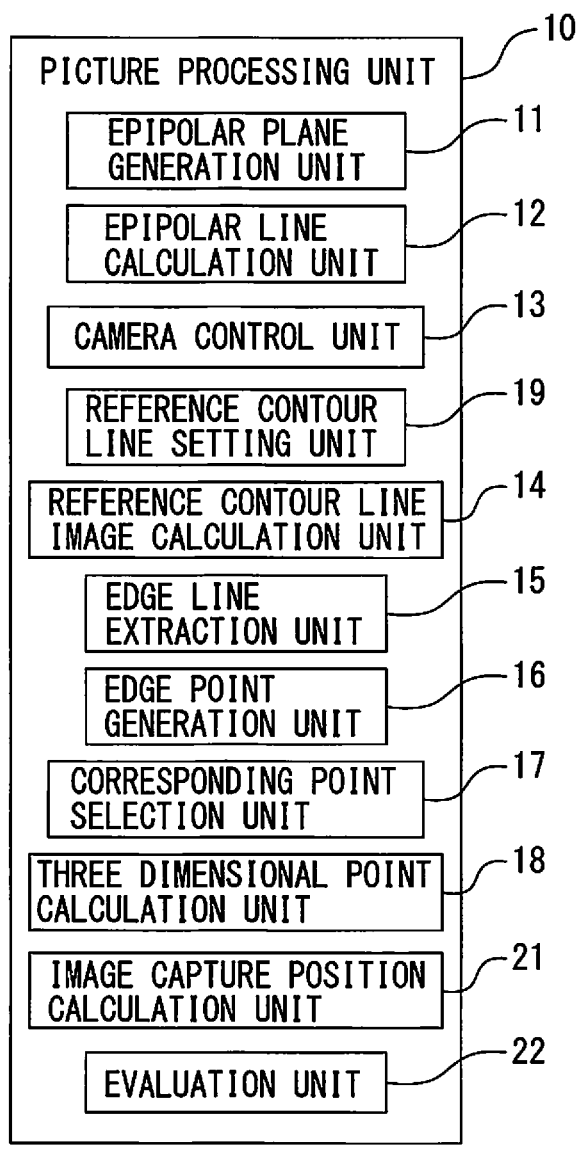
FIG. 16 is a block diagram illustrating a detailed configuration of the picture processing unit in a visual sensor control device in FIG. 14 or FIG. 15.

In the second embodiment, the cameras 3A, 3B or the workpiece 2 is transferred by using the robot 60 so that three dimensional points of portions different from each other of the contour line of the workpiece 2 can be measured. FIG. 16 is a diagram illustrating a configuration of the picture processing unit 10 according to the second embodiment. The picture processing unit 10 further includes, in addition to the configuration in FIG. 3, an image capture position calculation unit 21 and an evaluation unit 22.

The image capture position calculation unit 21 calculates a target position (position and posture) of the arm head portion. The robot control device 65 controls the robot 60 in such a manner as to transfer the arm head portion to the target position. The camera control unit 13 makes the cameras 3A, 3B capture a picture of the workpiece 2 in the state in which the arm head portion is transferred to be at the target position.

The image capture position calculation unit 21 determines the target position of the arm head portion in consideration of a normal line direction at a gaze point on the reference contour line so that the reference contour line can be easily measured. For example, when the reference contour line represents a processed surface of the workpiece 2, the target position of the arm head portion is determined so that the normal line direction at the gaze point is perpendicular to the processed surface.

Further, the target position is determined so that the following three conditions are satisfied: (1) an intersection of the optical axis of the first camera 3A and the optical axis of the second camera 3B and the gaze point are at the same position; (2) the normal line direction at the gaze point is parallel to a sum of a vector representing a direction of the optical axis of the first camera 3A and a vector representing a direction of the optical axis of the second camera 3B; and (3) a line of intersection of a plane formed by the optical axis of the first camera 3A and the optical axis of the second camera 3B and a plane which passes the gaze point and is determined by a normal line at the gaze point is at a right angle to a tangential line at the gaze point on the reference contour line. Thereby, the epipolar line EL on the picture is unlikely to be parallel to the edge line 50, which makes measurement of the reference contour line easier.

In the second embodiment, when the contour line is large in relation to the image capture areas AR1, AR2 of the cameras 3A, 3B, respectively, the plurality of target positions are preferably set and measuring the contour line is preferably divided by plural steps. In this case, the robot control device 65 transfers the arm head portion to the plurality of target positions one by one, and a configuration is made so that, every time the arm head portion transfers to the plurality of target positions, the first camera 3A and the second camera 3B capture a picture of the workpiece 2.

The plurality of target positions may be manually set and also automatically set. When the target positions are automatically set, first, a gaze point is set on the reference contour line, and, a target position of the arm head portion is determined as described above. A portion of the reference contour line which corresponds to the target position and is contained in both of the image capture area AR1 of the first camera 3A and the image capture area AR2 of the second camera 3B is stored as a virtually captured portion in a memory. Note that the image capture areas AR1, AR2 are not only physically limited by the cameras themselves but also limited by setting a process region in software.

Subsequently, a new gaze point is set outside the virtually captured portion, then the above processing is repeated by using the gaze point, and the virtually captured portion is additionally stored in the memory. Setting a new gaze point and storing a virtually captured portion in the memory are repeated until the virtually captured portions contain the entirety of the reference contour line. Thereby, measurement of the entirety of the contour line can be performed. In this case, the virtually captured portions adjacent to each other preferably partially overlap with each other so that there is no uncaptured portion therebetween. The gaze points may be sequentially determined while an overlapping state of the virtually captured portions is evaluated.

A target position setting method is not limited to the above. For example, a target position may be determined in consideration of a transfer distance of the arm head portion from one target position to the following target position. In setting the target positions, an area in which the robot can transfer is preferably considered.

Figure 17:
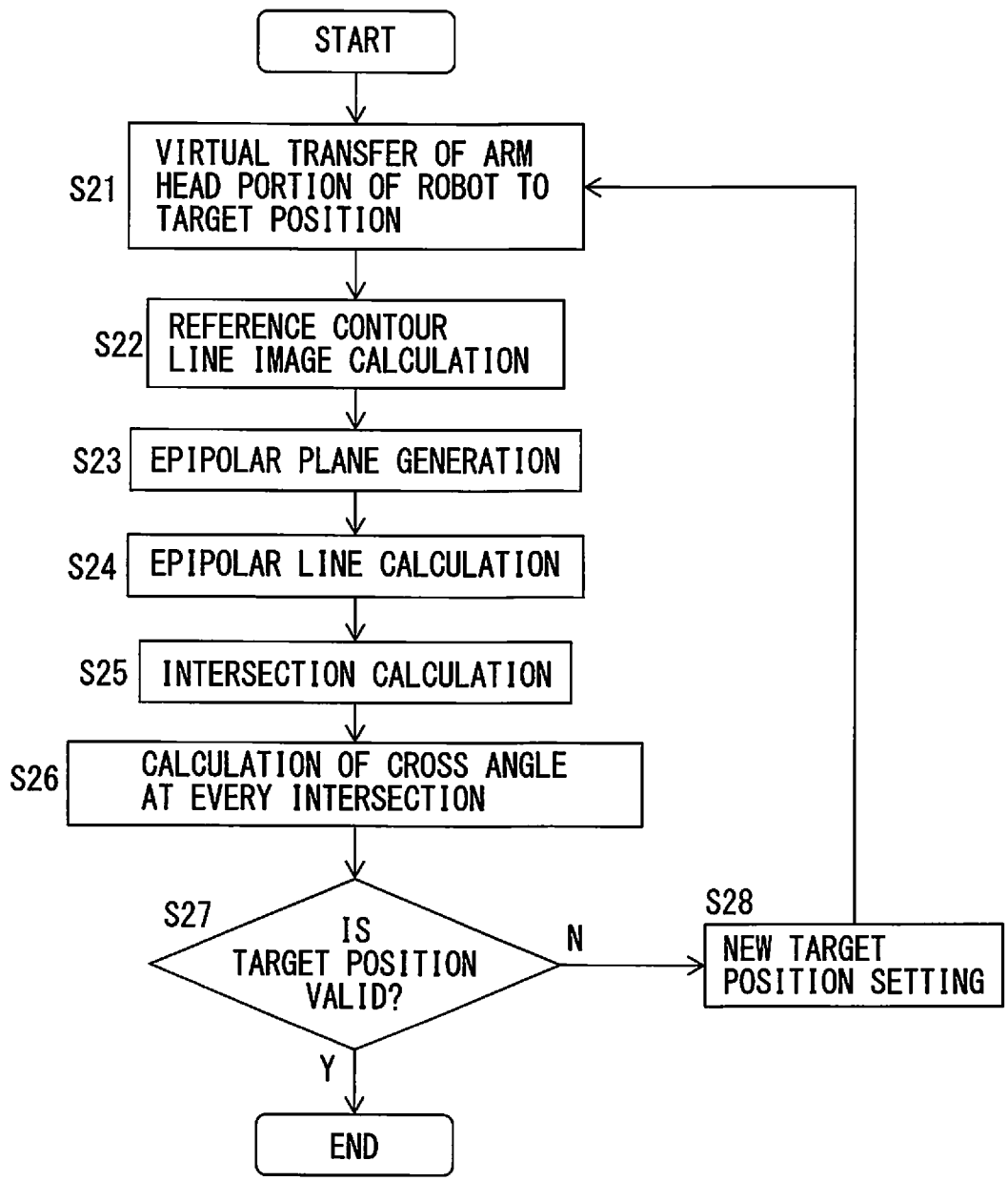
FIG. 17 is a flowchart illustrating an example of a processing mainly in an evaluation unit in FIG. 16.

The evaluation unit 22 illustrated in FIG. 16 evaluates the validity of the target position of the arm head portion. FIG. 17 is a flowchart illustrating an example of a processing mainly in the evaluation unit 22. The processing illustrated in the flowchart is started for example, every time a target position of the arm head portion is calculated by the image capture position calculation unit 21.

In a step S21, the arm head portion of the robot 60 (FIG. 14) to which the pair of cameras 3A, 3B are attached or the robot 60 (FIG. 15) which holds the workpiece 2 is virtually transferred to a target position. In a step S22, in the state in which the arm head portion is transferred to be at the target position, the reference contour line of the workpiece is projected on the imagining surface 30A of the first camera 3A and the imagining surface 30B of the second camera to calculate a virtual reference contour line image.

In a step S23, the plurality of epipolar planes ES are generated in a common visual field of the first camera 3A and the second camera 3B. The epipolar planes ES may be generated with a predetermined space therebetween, and, in a manner similar to the step S15 in FIG. 13, a plurality of points are generated on the virtual reference contour line image with a predetermined space therebetween, and the epipolar planes may be generated in such a manner as to pass the points. In a step S24, the plurality of epipolar lines EL in which the plurality of epipolar planes ES and the imaging surfaces 30A, 30B of the cameras 3A, 3B, respectively, cross with respect to each other are calculated.

In a step S25, a plurality of intersections in which the virtual reference contour line image and the plurality of epipolar lines EL cross with respect to each other are calculated. In a step S26, a cross angle of the virtual reference contour line image and the epipolar line EL at each intersection is calculated. For example, the cross angle is given by subtracting an angle of the epipolar line EL from an angle of the virtual reference contour line image, and when the cross angle is greater than 90°, subtraction by 180° is made so that the cross angle ranges from −90° or more to 90° or less.

In a step S27, determination is made on the basis of the cross angle calculated in the step S26 whether or not the target position is valid. For example, when the absolute value of the cross angle at every intersection is greater than a predetermined angle, cases in which the epipolar line EL and the reference contour line image are parallel to each other or nearly parallel to each other are excluded, and consequently the target position is determined to be valid. Alternatively, the validity of the target position can be evaluated on the basis of the number of the intersections at which the absolute value of the cross angle is not more than the predetermined angle, or a ratio of the number of the intersections at which the absolute value of the cross angle is not more than the predetermined angle to the total number of the intersections. The target position may be determined to be valid when a portion to be measured of the contour line is designated in advance and the absolute value of the cross angle at the intersection in the portion is greater than the predetermined angle.

When the step S27 is affirmed, the processing is terminated. Then, the robot control device 65 transfers the arm head portion of the robot 60 to the target position which has been evaluated to be valid by the evaluation unit 22. On the other hand, when the step S27 is negated, an advance to a step S28 is made.

In the step S28, the image capture position calculation unit 21 calculates a new target position in which the absolute value of the cross angle is great, and a return to step S21 is made. The new target position can be calculated, for example, in the following manner. First, a sum of a vector representing a direction of the optical axis of the first camera and a vector representing a direction of the optical axis of the second camera is calculated. Then, with the sum of the vectors as a rotation axis, the arm head portion is made to rotate about the rotation axis. A rotation angle in this case may be, for example, a predetermined step angle, or a step angle in which a range from 0 to 90° can be divided in a plural manner. The rotation angle is increased or decreased by the step angle in a range from −90° to 90°, thereby a target position which is evaluated to be valid by the evaluation unit 22 is searched. Alternatively, an average value, a mean value, or a most frequent value of cross angle may be added to −90° or 90° to determine the rotation angle. A rotation direction of the arm head portion may be any direction, and may be determined in consideration of position and posture, transfer, and the like of the robot 60. When rotation is enabled in any direction, a direction in which the absolute value of the rotation angle is small may be selected.

When rotation of the arm head portion fails to sufficiently increase the cross angle at every intersection at a time, a plurality of target positions may be set and a three dimensional point on the contour line at each target position may be measured. For example, when the cross angle is uniformly distributed in a range from −90° to 90°, the cross angle at intersections fails to be sufficiently increased at a time, and thus this method is effective.

Figure 18:
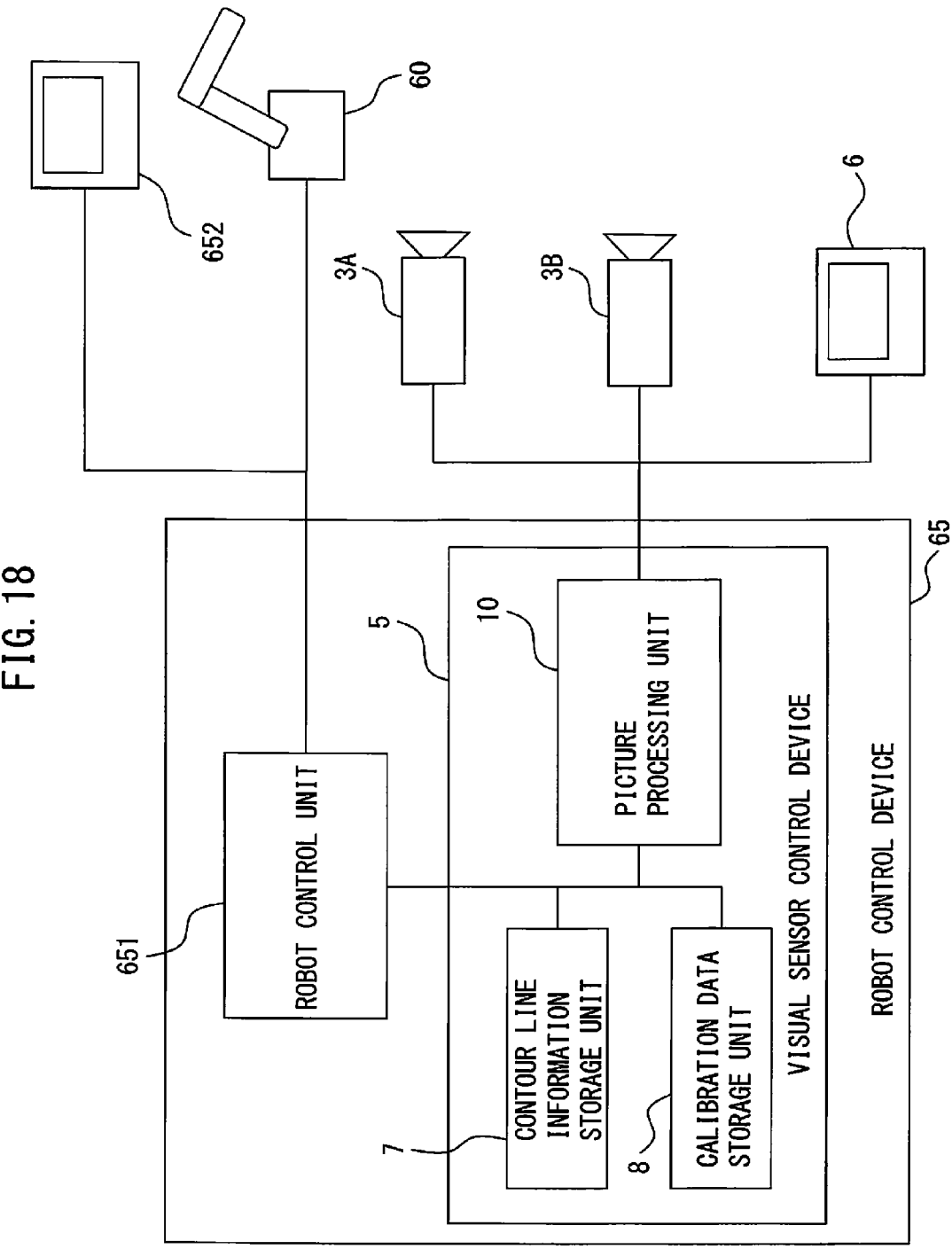
FIG. 18 is a diagram illustrating a modified example of FIG. 14 or FIG. 15.

As described above, the robot control device 65 and the visual sensor control device 5 are separately provided (FIG. 14 or FIG. 15). Alternatively, the visual sensor control device 5 may be provided in the robot control device 65. FIG. 18 is a diagram illustrating a modified example thereof. As illustrated in FIG. 18, a robot control unit 651 and the visual sensor control device 5 are provided in the robot control device 65. A robot operation console 652 which inputs various instructions with regard to operations of the robot 60 and the robot 60 are connected to the robot control unit 651.

Modified Examples

Such modifications of the above first embodiment and the second embodiment as described below are possible. A position posture measurement unit (for example, a three dimensional measurement sensor 31 in FIG. 1) for measuring a position and posture of the workpiece 2 may be additionally provided, and the position and posture of the workpiece 2 which has been measured in the position posture measurement unit may be stored in the contour line information storage unit 7. In this case, for example, the reference contour line image calculation unit 14 may alter, on the basis of the measured position and posture of the workpiece 2, workpiece position information stored in the contour line information storage unit 7, and project the reference contour line based on the altered workpiece position information on the pictures. Thereby, even when the workpiece 2 is disposed at a position different from a workpiece position stored in the contour line information storage unit 7, the contour line of the workpiece 2 can be appropriately detected.

The three dimensional measurement sensor may be provided, as illustrated in FIG. 1, to be fixed on the stand, or the like, or to be equipped at the arm head portion of the robot 60. At least one of the pair of the cameras 3A, 3B may have a function of the three dimensional measurement sensor. As the three dimensional measurement sensor, a laser scan sensor and a stereo camera may be used. Alternatively, the position and posture of the workpiece 2 may be measured by using a three-point touch-up method by a force sensor, or by a two dimensional camera. The position and posture of the workpiece 2 is determined by components (six components) of six-axis direction (orthogonal three-axis direction and rotation three-axis direction), but only a part of the components may be measured by the three dimensional measurement sensor. Note that, since the workpiece 2 causes a fixture difference, measurement of the position and posture of the workpiece 2 by the three dimensional measurement sensor does not allow the three dimensional contour line shape of the workpiece 2 to be accurately measured.

In the above embodiments (FIGS. 14, 15), the robot system is configured to make the pair of cameras 3A, 3B obtain a pair of pictures, but a single camera 3 (for example, the first camera 3A) may obtain a pair of pictures, thereby enabling decrease in costs. In this case, the arm head portion of the robot (FIG. 14) equipped with the single camera 3 may be successively transferred to a first position and a second position which correspond to the relative positions and posture of the pair of the cameras 3A, 3B relative to the workpiece 2. Alternatively, the arm head portion of the robot (FIG. 16) holding the workpiece 2 may be successively transferred to a first position and a second position which correspond to the relative positions and postures of the workpiece 2 relative to the pair of the cameras 3A, 3B, and a picture of the workpiece 2 can be captured at each of the first position and the second position. In such a manner, pictures corresponding to the pictures of the pair of cameras 3A, 3B can be obtained.

When the single camera 3 is used, the first position and the second position may be determined on the basis of a condition that a relative position of the pair of cameras 3A, 3B is constant, and the first position and the second position may be determined so that the relative position is altered according to a captured portion of the workpiece 2. When a picture of the contour line of the workpiece 2 is captured in plural steps by using the single camera 3, a picture of the workpiece 2 is captured at each of the plurality of first positions and the plurality of second positions. In this case, capturing a picture may not be performed alternately at the first positions and at the second positions, but a picture may be captured at the plurality of first positions, and then a picture may be captured at the plurality of second positions. Thereby, a transfer amount of the robot 60 can be reduced, and measurement of the contour line can be effectively performed.

In the above embodiments, through a processing in the corresponding point selection unit 17, from the first edge point group and the second edge point group which are candidates for the edge point pair, the first edge point EP and the second edge point EP which correspond to each other are selected. In doing so, a difference between an orientation of each edge line 50 passing the edge point EP and an orientation of the reference contour line image 40 at the nearest point NP corresponding to the edge point EP may be calculated, and the edge points EP having this difference by the predetermined angle or more may be excluded from candidates for the edge point pair. In other words, the corresponding point selection unit 17 may select pairs of edge points on condition that orientation difference is less than the predetermined angle. Thereby, the edge points EP and the nearest points NP favorably correspond to each other and an accurate edge point pair can be selected.

Further, in the above embodiments, the edge line extraction unit 15 extracts, from the edge lines 50 on the pictures, such edge lines 50 as to determine the first edge point group and the second edge point group, but, alternatively, such edge lines 50 that a light-and-shade orientation of the edge line 50 at the edge points EP and a light-and-shade orientation of the reference contour line image 40 at the nearest points NP corresponds to each other may be extracted. The light-and-shade orientation indicates which of two regions having the reference contour line image 40 and the edge line 50 as a border is luminous. For example, provided that an orientation of the edge line 50 is represented by two dimensional vector a, a and −a means that the orientations of the edge lines 50 are equal to each other but the light-and-shade orientations thereof are different from each other.

The light-and-shade orientation can be specified on the basis of light-and-shade information in the vicinity of the reference contour line image 40 and light-and-shade information in the vicinity of the edge line 50. The light-and-shade information in the vicinity of the reference contour line image 40 is stored in advance as information of the reference contour line in the contour line information storage unit 7. On the other hand, the light-and-shade information in the vicinity of the edge line 50 can be obtained from pictures. In such a manner, the edge lines 50 are extracted in consideration of the light-and-shade orientations of each of the reference contour line image 40 and the edge line 50 so that, when the edge point pair is selected through the reference contour line image 40, the correct edge pair can be selected.

In the above embodiments, the edge line detection region 41 (a first picture processing region and a second picture processing region) is set in the vicinity of the reference contour line images 40 (a first reference contour line image and a second reference contour line image) on a pair of pictures. Further, in the edge line detection region, the edge lines 50 (first edge line, second edge line) are extracted, but the edge lines 50 may be extracted without setting the picture processing regions, and a configuration of the edge line extraction unit 15 is not limited to the above configuration. A part of the processing (for example, setting and evaluation of the target positions) in the picture processing unit 10 may be performed by using an offline simulation device.

In the above embodiments, the contour line measurement device measures the contour line of the workpiece 2, but a contour line of the other objects can be measured in a similar manner. In the above embodiments, when a pair of edge points corresponding to each other on a corresponding pair of pictures is determined, a three dimensional reference contour line stored in advance in the contour line information storage unit 7 is set, but a configuration of the reference contour line setting unit is not limited to this. When the relative position and posture of the cameras 3A, 3B relative to the workpiece 2 can be altered, any configuration of the robot 60 included in the configuration of the robot system may be adopted.

In the above embodiments, the nearest points NP corresponding to the edge points EP on a pair of the pictures (the first edge point, second edge point) are determined and further the projection base points (the first projection base point, the second projection base point) on the reference contour line images (the first reference contour line image, the second reference contour line image) corresponding to the nearest points NP are each determined. A pair of edge points is selected on the basis of a position relationship between the first projection base point and the second projection base point, but a configuration of the corresponding point selection unit 17 is not limited to this. In other words, when, from the plurality of first edge points EP and the plurality of the second edge points EP which are intersections of the edge lines 50 (the first edge line, the second edge line) on a pair of pictures and the plurality of epipolar lines EL, a pair of edge points consisting of the first edge point EP and the second edge point EP which are generated by using the same epipolar plane ES and correspond to the same portion of the reference contour line are selected, the processing by the corresponding point selection unit 17 is not limited to the processing in the step S7 in FIG. 4. Further, when, from the plurality of first edge points EP and the plurality of second edge points EP, a pair of edge points EP which consist of the first edge point EP and the second edge point determined on the basis of this first edge point EP and correspond to the same portion of the reference contour line are selected, the processing by the corresponding point selection unit 17 is not limited to the processing in the step S17 in FIG. 13.

According to the present invention, since a pair of edge points which correspond to the same portion of the reference contour line of an object are selected, even when there are the plurality of edge lines which cross the epipolar line, the pair of edge points can be favorably made to correspond to each other, and a three dimensional contour line shape of the object can be accurately measured.

The above description is exemplary and the present invention is not limited to the above embodiments and modified examples so far as the features of the invention are not damaged. Constituent elements in the above embodiments and modified examples include those that can be replaceable while maintaining the unity of the invention and obviously replaceable. In other words, other embodiments that are considered to fall within the scope of the technical idea of the present invention are also included within the range of the present invention. Further, the above embodiments and one or more modified examples can be arbitrarily combined with each other.

The invention claimed is:

1. A contour line measurement apparatus comprising:
a first camera and a second camera which capture a picture of an object to obtain a first object picture and a second object picture, respectively;
an epipolar plane generation unit for generating, on the basis of a position and posture of the first camera and the second camera, a plurality of epipolar planes so as to cross the object;
an epipolar line calculation unit for calculating a plurality of first epipolar lines in which the plurality of epipolar planes are projected on an imaging surface of the first camera and a plurality of second epipolar lines in which the plurality of epipolar planes are projected on an imaging surface of the second camera;
a reference contour line setting unit for setting a three dimensional reference contour line of the object;
a reference contour line image calculation unit for calculating a first reference contour line image and a second reference contour line image in which the reference contour line is projected on the imaging surface of the first camera and the imaging surface of the second camera, respectively;
an edge line extraction unit which sets a first picture processing region in the vicinity of the first reference contour line image and extracts, from the first object picture in the first picture processing region, a first edge line which is an image of a contour line of the object, while setting a second picture processing region in the vicinity of the second reference contour line image and extracting, from the second object picture in the second picture processing region, a second edge line which is an image of the contour line of the object;
an edge point generation unit for generating a plurality of first edge points which are intersections of the first edge line and the plurality of first epipolar lines and a plurality of second edge points which are intersections of the second edge line and the plurality of second epipolar lines;
a corresponding point selection unit for selecting, from the plurality of first edge points and the plurality of second edge points, a pair of edge points consisting of the first edge point and the second edge point which are generated by using the same epipolar plane and correspond to the same portion of the reference contour line; and
a three dimensional point calculation unit for calculating a three dimensional point on the contour line of the object on the basis of a visual line of the first camera and a visual line of the second camera which pass the pair of edge points.

2. The contour line measurement apparatus according to claim 1, further comprising a position posture measurement unit for measuring a position and posture of the object, wherein
the reference contour line setting unit alters a position and posture of the reference contour line on the basis of the position and posture of the object which is measured by the position posture measurement unit.

3. The contour line measurement apparatus according to claim 1, wherein
the corresponding point selection unit determines every intersection of each of the plurality of epipolar planes with the reference contour line,
when there are the plurality of intersections with respect to the single epipolar plane, the corresponding point selection unit divides the epipolar plane so that there is the single intersection with respect to the epipolar plane, and selects a pair of edge points corresponding to the same portion from the edge points corresponding to the divided epipolar plane.

4. The contour line measurement apparatus according to claim 1, wherein
the corresponding point selection unit calculates, with respect to each of the plurality of first edge points, a nearest point on the first reference contour line image which corresponds to the first edge point, and calculates an intersection of a visual line from the first camera which passes the nearest point and the reference contour line as a first projection base point, while calculating, with respect to each of the plurality of second edge points, a nearest point on the second reference contour line image which corresponds to the second edge point, and calculates an intersection of a visual line from the second camera which passes the nearest point and the reference contour line as a second projection base point, and, further, selects the pair of edge points on the basis of a position relationship of the first projection base point and the second projection base point.

5. The contour line measurement apparatus according to claim 4, wherein
the corresponding point selection unit selects the pair of edge points on condition that a difference between an orientation of the first edge line and an orientation of the first reference contour line image at the nearest point which corresponds to the first edge line and a difference between an orientation of the second edge line and an orientation of the second reference contour line image at the nearest point which corresponds to the second edge line are less than a predetermined angle.

6. The contour line measurement apparatus according to claim 1, wherein
the first reference contour line image and the second reference contour line image contain light-and-shade information of a picture in the vicinity of the first reference contour line image and light-and-shade information of a picture in the vicinity of the second reference contour line image, respectively,
the edge line extraction unit extracts such first edge line and second edge line that a light-and-shade orientation of a picture in the vicinity of the first edge line and a light-and-shade orientation of a picture in the vicinity of the second edge line respectively correspond to a light-and-shade orientation in the vicinity of the first reference contour line image and a light-and-shade orientation in the vicinity of the second reference contour line image which are obtained by the corresponding light-and-shade information.

7. A robot system comprising:
a robot;
a robot control unit for controlling the robot; and
the contour line measurement apparatus according to claim 1, wherein
the first camera and the second camera which are included in the contour line measurement apparatus are attached to an arm head portion of the robot, or an object of which a picture is captured by the first camera and the second camera is held by the arm head portion of the robot.

8. The robot system according to claim 7, further comprising an image capture position calculation unit for calculating a target position of the arm head portion of the robot, wherein
the robot control unit transfers the arm head portion of the robot to the target position, and
the first camera and the second camera capture a picture of the object in the state in which the arm head portion of the robot is transferred to be at the target position.

9. The robot system according to claim 8, wherein
the image capture position calculation unit calculates the plurality of target positions so that the first camera and the second camera capture pictures of the object in plural steps,
the robot control unit transfers the arm head portion of the robot to the plurality of target positions one by one, and
the first camera and the second camera capture a picture of the object every time the arm head portion of the robot is transferred to the plurality of target positions.

10. The robot system according to claim 8, further comprising an evaluation unit for evaluating the validity of a target position of the arm head portion of the robot, wherein
on the assumption that the arm head portion of the robot is transferred to the target position, the evaluation unit calculates the first reference contour line image and the second reference contour line image in which the reference contour line of the object is projected on the imaging surface of the first camera and the imaging surface of the second camera, respectively, calculates a cross angle at intersections of the first reference contour line image and the epipolar lines and a cross angle at intersections of the second reference contour line image and the epipolar lines, and evaluates that the target position is valid when the cross angle at each of the intersections is greater than a predetermined angle, and the robot control unit transfers the arm head portion of the robot to the target position which has been evaluated to be valid by the evaluation unit.

11. The robot system according to claim 10, wherein
the image capture position calculation unit calculates such a new target position as to increase the cross angle, when the target position is evaluated to be invalid by the evaluation unit.

12. The robot system according to claim 7, wherein
the first camera and the second camera are composed of a single camera, and
the robot control unit transfers the arm head portion of the robot so that the first object picture and the second object picture are obtained under positions and postures in which the relative positions and postures of the single camera and the object are different from each other.

13. A contour line measurement apparatus comprising:
a first camera and a second camera which capture a picture of an object to obtain a first object picture and a second object picture, respectively;
a reference contour line setting unit for setting a three dimensional reference contour line of the object;
a reference contour line image calculation unit for calculating a first reference contour line image and a second reference contour line image in which the reference contour line is projected on an imaging surface of the first camera and an imaging surface of the second camera, respectively;
an edge line extraction unit which sets a first picture processing region in the vicinity of the first reference contour line image and extracts, from the first object picture in the first picture processing region, a first edge line which is an image of a contour line of the object, while setting a second picture processing region in the vicinity of the second reference contour line image and extracting, from the second object picture in the second picture processing region, a second edge line which is an image of the contour line of the object;
a first edge point generation unit for generating a plurality of first edge points on the first edge line;
an epipolar plane generation unit for generating, on the basis of a position and posture of the first camera and the second camera, a plurality of epipolar planes passing the plurality of first edge points respectively;
an epipolar line calculation unit for calculating a plurality of epipolar lines in which the plurality of epipolar planes are projected on the imaging surface of the second camera;
a second edge point generation unit for generating a plurality of second edge points which are intersections of the plurality of epipolar lines and the second edge line;
a corresponding point selection unit for selecting, from the plurality of first edge points and the plurality of second edge points, a pair of edge points consisting of the first edge point and the second edge point which are generated by using the first edge point and correspond to the same portion of the reference contour line; and
a three dimensional point calculation unit for calculating a three dimensional point on the contour line of the object on the basis of a visual line of the first camera and a visual line of the second camera which pass the pair of edge points.

14. A robot system comprising:
a robot;
a robot control unit for controlling the robot; and the contour line measurement apparatus according to claim 13, wherein
the first camera and the second camera which are included in the contour line measurement apparatus are attached to an arm head portion of the robot, or an object of which a picture is captured by the first camera and the second camera is held by the arm head portion of the robot.

* * * * *